(12) United States Patent
Shobe et al.

(10) Patent No.: US 12,553,220 B2
(45) Date of Patent: Feb. 17, 2026

(54) WORK MACHINE SYSTEM WITH SMART DRIVE

(71) Applicant: Great Plains Manufacturing, Inc., Salina, KS (US)

(72) Inventors: Matthew Shobe, Salina, KS (US); Yuji Fukuda, Grapevine, KS (US); Jeff Welsh, Abilene, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 183 days.

(21) Appl. No.: 18/484,021

(22) Filed: Oct. 10, 2023

(65) Prior Publication Data
US 2024/0117602 A1    Apr. 11, 2024

Related U.S. Application Data

(60) Provisional application No. 63/378,954, filed on Oct. 10, 2022.

(51) Int. Cl.
*E02F 9/26*  (2006.01)
*E02F 3/34*  (2006.01)
*E02F 3/96*  (2006.01)
*E02F 9/20*  (2006.01)
*E02F 9/22*  (2006.01)
(Continued)

(52) U.S. Cl.
CPC ............ *E02F 9/265* (2013.01); *E02F 3/3414* (2013.01); *E02F 9/2012* (2013.01); *E02F 9/2025* (2013.01); *E02F 9/205* (2013.01); *E02F 9/2253* (2013.01); *E02F 9/264* (2013.01); *G06T 11/00* (2013.01); *H04N 7/181* (2013.01);
(Continued)

(58) Field of Classification Search
CPC ....... E02F 9/265; E02F 9/2012; E02F 9/2025; E02F 9/205; E02F 9/2253; E02F 9/264; E02F 3/3414; E02F 3/96; G06T 11/00; G06T 2207/20212; H04N 7/181; H04N 23/64; H04N 23/90
See application file for complete search history.

(56) References Cited

U.S. PATENT DOCUMENTS 4,261,229 A * 4/1981 Mizuno ............... B60W 10/101
                                                              477/68
6,542,789 B2    4/2003 Ufheil
(Continued)

FOREIGN PATENT DOCUMENTS

JP    11-158940 A    6/1999
JP    2007-069799 A    3/2007
(Continued)

OTHER PUBLICATIONS

PCT Search Report and Written Opinion dated Mar. 15, 2024 for related PCT Patent Application No. PCT/US2023/076471, 12 pages.
(Continued)

*Primary Examiner* — Russell Frejd
(74) *Attorney, Agent, or Firm* — Hovey Williams LLP; Kameron D. Kelly

(57) ABSTRACT

A system comprising a work machine and an attachment removably coupled with the work machine. The attachment includes an identification module comprising a transceiver configured to communicate with a control system of the work machines so as to improve the functionality and efficiency of the attachment and of the work machines.

20 Claims, 17 Drawing Sheets

(51) Int. Cl.
*G06T 11/00* (2006.01)
*H04N 7/18* (2006.01)
*H04N 23/60* (2023.01)
*H04N 23/90* (2023.01)

(52) U.S. Cl.
CPC ............. *H04N 23/64* (2023.01); *H04N 23/90* (2023.01); *E02F 3/96* (2013.01); *G06T 2207/20212* (2013.01)

(56) References Cited

U.S. PATENT DOCUMENTS

| | | | |
|---|---|---|---|
| 7,630,793 B2 | 12/2009 | Thomas et al. | |
| 7,861,741 B2 | 1/2011 | Kress | |
| 8,862,274 B2 | 10/2014 | Reiter et al. | |
| 9,063,530 B2 | 6/2015 | Lougheed et al. | |
| 9,593,469 B2 | 3/2017 | Taylor et al. | |
| 9,938,693 B1 | 4/2018 | Reed et al. | |
| 10,302,027 B2 | 5/2019 | Hansen et al. | |
| 10,431,016 B2 | 10/2019 | Gresch | |
| 10,479,354 B2 | 11/2019 | Posselius et al. | |
| 10,668,854 B2 | 6/2020 | Imaizumi et al. | |
| 11,008,849 B2 | 5/2021 | Sherlock | |
| 2001/0032031 A1* | 10/2001 | Ufheil | E02F 9/2228 700/169 |
| 2004/0017281 A1 | 1/2004 | Dix | |
| 2004/0024510 A1 | 2/2004 | Finley et al. | |
| 2007/0119161 A1* | 5/2007 | Du | F16H 61/433 60/451 |
| 2009/0118844 A1 | 5/2009 | Schmuck et al. | |
| 2009/0171482 A1 | 7/2009 | Mindeman et al. | |
| 2009/0198382 A1 | 8/2009 | Koch et al. | |
| 2009/0198409 A1 | 8/2009 | Rector et al. | |
| 2011/0150614 A1* | 6/2011 | Nicholson | E02F 3/431 701/50 |
| 2011/0276222 A1 | 11/2011 | Lougheed et al. | |
| 2011/0313625 A1 | 12/2011 | Miller et al. | |
| 2016/0138247 A1 | 5/2016 | Conway et al. | |
| 2016/0312432 A1 | 10/2016 | Wang et al. | |
| 2017/0108015 A1* | 4/2017 | Kleitsch | F15B 11/006 |
| 2017/0328031 A1* | 11/2017 | Jang | E02F 9/265 |
| 2017/0372534 A1 | 12/2017 | Steketee et al. | |
| 2019/0183048 A1 | 6/2019 | Flintoft et al. | |
| 2020/0181878 A1 | 6/2020 | Mahrenholz et al. | |
| 2020/0181880 A1 | 6/2020 | Meyer et al. | |
| 2021/0032839 A1 | 2/2021 | Ready-Campbell et al. | |
| 2021/0298220 A1 | 9/2021 | Kean et al. | |
| 2021/0406637 A1 | 12/2021 | Koekemoer | |
| 2022/0025611 A1 | 1/2022 | Kandula et al. | |
| 2022/0056862 A1 | 2/2022 | Goli et al. | |

FOREIGN PATENT DOCUMENTS

| | | |
|---|---|---|
| JP | 4279275 B2 | 6/2009 |
| JP | 2012-219516 A | 11/2012 |
| JP | 2011188756 A | 8/2014 |
| JP | 2018085907 A | 5/2018 |
| KR | 10-2010-0074557 A | 7/2010 |
| KR | 10-2015-0058232 A | 5/2015 |
| KR | 10-1559174 B1 | 10/2015 |
| KR | 10-2018-0120665 A | 11/2018 |
| KR | 10-2157285 B1 | 9/2020 |
| WO | 2019097683 A1 | 5/2019 |

OTHER PUBLICATIONS

Advanced Display User Guide for Skid Steer, Compact Track and Multi-Terrain Loaders, CAT, chrome-extension://efaidnbmnnnibpcajpcglclefindmkaj/ https://s7d2.scene7.com/is/content/Caterpillar/CM20191127-28659-69c10, 2019, 34 pages.

CAT Equipment Management Cat PL161 Attachment Tracker, https://www.cat.com/en_US/products/new/technology/equipment-management/equipment-management/15969715.html, Caterpillar, retrieved on Feb. 27, 2024, 7 pages.

Excavators, John Deere US, https://www.deere.com/en/excavators/, retrieved on Feb. 27, 2024, 4 pages.

Jordanne Waldschmidt, Cat Smart Creep Maximizes Cold Planer, Saw Attachments on Skid Steers, CTLs, https://www.equipmentworld.com/attachments/article/ 15288004/cat-smart-creep-keeps-attachments-running-at-optimal-speeds, Apr. 4, 2023, 9 pages.

PCT Search Report and Written Opinion dated Feb. 7, 2024 for related PCT Patent Application No. PCT/US2023/076466, filed Oct. 10, 2023, 9 pages.

\* cited by examiner

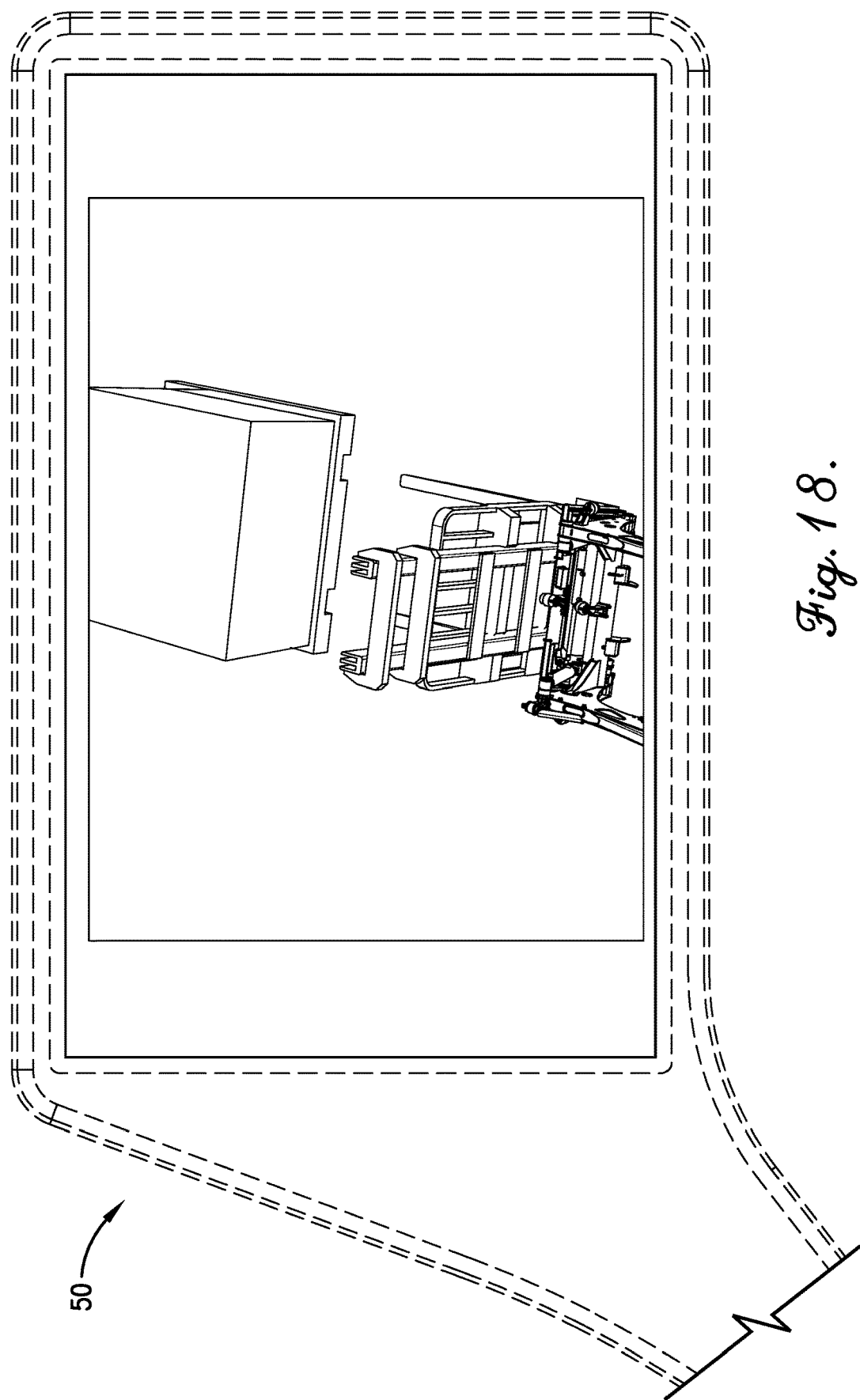

WORK MACHINE SYSTEM WITH SMART DRIVE

The present non-provisional patent application claims priority benefit to U.S. Provisional Patent Application Ser. No. 63/378,954, filed on Oct. 10, 2022, and entitled "SMART ATTACHMENTS FOR A WORK MACHINE." The entirety of the above-identified provisional patent application is hereby incorporated by reference into the present non-provisional patent application.

FIELD OF THE INVENTION

Field of the Invention

Embodiments of the present invention are generally directed to work machines and associated attachments. More particularly, embodiments of the present invention are directed to smart attachments for work machines, with such smart attachments configured to communicate with the work machines so as to improve the functionality and efficiency of the attachments and the work machines.

Background of the Invention

There are many types of work machines on the market today. An exemplary type of work machine is a utility loader (e.g., track loader or skid steer), which is a machine commonly used as a hydraulic tool carrier configured to carry and operate a variety of hydraulically-driven tools or attachments. Common attachments include hydraulically-powered attachments such as augers, trenchers, sweepers, grapples, etc. Other non-hydraulic attachments may also be carried and operated by utility loaders, such as buckets, rakes, pallet forks, plows, etc.

Generally, there is little or no communication between work machines and their associated attachments. For example, for most non-hydraulically-powered attachments, such an attachment is simply coupled mechanically with a work machine, and an operator controls the attachment from a control station of the work machine by adjusting the positions of various cylinders (or other actuators) of the work machine. The only information or feedback being provided to the operator is visual feedback obtained by the operator's eyes viewing the attachment and the surrounding work area. For certain hydraulically-powered attachments, the work machine or the attachment may include simple sensors configured to monitor various operating parameters of the work machine or the attachment. However, there is commonly little or no communication between the attachment and its associated work machine.

As a result, there is a need for smart attachments for work machines, with such smart attachments and work machines configured to communicate with each other. Such communication will improve the functionality and efficiency of the attachments and of the work machines.

SUMMARY

Embodiments of the present invention include a system for monitoring hydraulic pressure provided from a work machine to an attachment. The system comprises the work machine and the attachment. The attachment is configured to be removably coupled to the work machine. The work machine is configured to provide hydraulic fluid to the attachment. The work machine is configured to measure the hydraulic pressure of the hydraulic fluid provided to the attachment. The attachment includes an identification module with a transmitter configured to transmit identification information to the work machine when the attachment is coupled to the work machine. The work machine is configured to determine a preferred operating pressure at which hydraulic fluid is to be provided to the attachment. The preferred operating pressure is determined based on the identification information transmitted from the identification module to the work machine. The work machine is configured to compare the measured hydraulic pressure with the preferred operating pressure and to provide an indication to an operator of the work machine to adjust an operating parameter of the work machine if the measured hydraulic pressure deviates from the preferred operating pressure.

Embodiments of the present invention additionally include a method of monitoring hydraulic pressure provided from a work machine to an attachment. The method comprises a step of coupling the attachment to the work machine. The attachment includes an identification module with a transmitter. An additional step includes transmitting identification information from the identification module of the attachment to the work machine. An additional step includes determining a preferred operating pressure at which hydraulic fluid is to be provided from the work machine to the attachment. The preferred operating pressure is determined based on the identification information transmitted from the identification module to the work machine. An additional step includes providing hydraulic fluid, under pressure, from the work machine to the attachment. An additional step includes measuring the hydraulic pressure of the hydraulic fluid provided to the attachment. An additional step includes comparing the measured hydraulic pressure with the preferred operating pressure. A further step includes providing an indication to an operator of the work machine to adjust a travel speed of the work machine if the measured hydraulic pressure deviates from the preferred operating pressure.

Embodiments of the present invention additionally include a system for controlling a travel speed of a work machine. The system comprises the work machine and an attachment, with the attachment being configured to be removably coupled to the work machine. The work machine is configured to provide hydraulic fluid to the attachment and to measure the hydraulic pressure of the hydraulic fluid provided to the attachment. The attachment includes an identification module with a transmitter configured to transmit identification information to the work machine when the attachment is coupled to the work machine. The work machine is configured to determine a preferred operating pressure at which hydraulic fluid is to be provided to the attachment. The preferred operating pressure is determined based on the identification information transmitted from the identification module to the work machine. The work machine is configured to compare the measured hydraulic pressure with the preferred operating pressure and to automatically adjust a travel speed of the work machine if the measured hydraulic pressure deviates from the preferred operating pressure.

Embodiments of the present invention additionally include a method of controlling a travel speed of a work machine. The method comprises a step of coupling an attachment to the work machine, with attachment including an identification module with a transmitter. An additional step includes transmitting identification information from the identification module of the attachment to the work machine. An additional step includes determining a preferred operating pressure at which hydraulic fluid is to be provided from the work machine to the attachment. The preferred operating pressure is determined based on the identification information transmitted from the identification module to the work machine. An additional step includes providing hydraulic fluid, under pressure, from the work machine to the attachment. An additional step includes measuring the hydraulic pressure of the hydraulic fluid provided to the attachment. An additional step includes comparing the measured hydraulic pressure with the preferred operating pressure. A further step includes increasing a travel speed of the work machine if the measured hydraulic pressure is less than the preferred operating pressure, and decreasing the travel speed of the work machine if the measured hydraulic pressure is greater than the preferred operating pressure.

Embodiments of the present invention additionally include a system for controlling a flow rate of hydraulic fluid provided from a work machine to an attachment. The system comprises the work machine and the attachment, with the attachment being configured to be removably coupled to the work machine. The work machine is configured to provide hydraulic fluid to the attachment and to control a flow rate of the hydraulic fluid provided to the attachment. The attachment includes an identification module with a transmitter configured to transmit identification information to the work machine when the attachment is coupled to the work machine. The work machine is configured to determine a preferred operating flow rate for hydraulic fluid to be provided to the attachment. The preferred operating flow rate is determined based on the identification information transmitted from the identification module to the work machine. The work machine is configured to present, via a graphic display, an indication to the operator that the preferred operating flow rate has been determined. The work machine is configured to provide hydraulic fluid to the attachment at the preferred operating flow rate.

Embodiments of the present invention additionally include a method of controlling a flow rate of hydraulic fluid provided from a work machine to an attachment. The method comprises a step of coupling the attachment to the work machine, with the attachment including an identification module with a transmitter. An additional step includes transmitting identification information from the identification module of the attachment to the work machine. An additional step includes determining a preferred operating flow rate at which hydraulic fluid is to be provided from the work machine to the attachment. The preferred operating flow rate is determined based on the identification information transmitted from the identification module to the work machine. An additional step includes presenting the preferred operating flow rate on a graphic display associated with the work machine. A further step includes providing hydraulic fluid, at the preferred operating flow rate, from the work machine to the attachment.

Embodiments of the present invention additionally include a system for controlling a position of an attachment coupled to a work machine. The system comprises the work machine and the attachment, with the attachment being configured to be removably coupled to the work machine. The attachment includes an identification module with a transmitter configured to transmit identification information to the work machine when the attachment is coupled to the work machine. The identification module is further configured to transmit position information to the work machine. The work machine is configured to determine one or more physical dimensions of the attachment based on the identification module transmitted to the work machine from the identification module. The work machine is configured to determine a position of the attachment based on the position information and on the one or more physical dimensions of the attachment.

Embodiments of the present invention additionally comprise a method of controlling a position of an attachment coupled to a work machine. The method comprises a step of coupling the attachment to the work machine, with the attachment including an identification module with a transmitter. An additional step includes transmitting identification information from the identification module of the attachment to the work machine. An additional step includes determining one or more physical dimensions of the attachment. The physical dimensions are determined based on the identification information transmitted from the identification module to the work machine. An additional step includes transmitting position information from the identification module of the attachment to the work machine. A further step includes determining a position of the attachment based on the position information and on the one or more physical dimensions of said attachment.

Embodiments of the present invention additionally include a vision control system for a work machine. The system comprises the work machine and an attachment configured to be removably coupled to the work machine. The system additionally comprises a plurality of image sensors positioned on the work machine. The image sensors are configured to obtain images of the work machine, of the attachment, and/or of an operating environment around the work machine. The system additionally comprises a control system comprising a graphic display, with the control system being configured to present, via the graphic display, the images obtained from the plurality of image sensors. The attachment includes an identification module with a transmitter configured to transmit identification information to the work machine when the attachment is coupled to the work machine. The control system is configured to determine, based on the identification information received from the identification module, at least one preferred image sensor from the plurality of image sensors. Upon determining the at least one preferred image sensor, the control system is configured to present, via the graphic display, images obtained from the at least one preferred image sensor.

Embodiments of the present invention additionally comprise a method of controlling image sensors of a work machine. The method comprises a step of coupling an attachment to the work machine. The attachment includes an identification module with a transmitter. The work machine includes a plurality of image sensors positioned on the work machine and configured to obtain images of the work machine, of the attachment, and/or of an operating environment of the work machine. An additional step includes transmitting identification information from the identification module of the attachment to the work machine. An additional step includes determining, based on the identification information received from the identification module, at least one preferred image sensor from the plurality of image sensors. A further step includes presenting, via a graphic display associated with the work machine, images obtained from the at least one preferred image sensor.

Embodiments of the present invention additionally comprise a system for facilitating communication between a work machine and an attachment. The system comprises the work machine, with the work machine comprising a wireless receiver. The system additionally comprises the attachment, with the attachment being configured to be removably coupled to the work machine. The attachment includes an identification module with a transmitter configured to transmit identification information to the wireless receiver of the work machine when the attachment is coupled to the work machine. The work machine comprises a frame and a drive assembly configured to support the frame on a ground surface. The work machine includes a control station comprising a cab with a front side and roof. The front side of the cab includes a front viewing portion for the operator to view the attachment. The roof includes an overhang portion that extends forward from the front side of the cab to at least partially overhang the front viewing portion of the cab. The wireless receiver of the work machine is attached to the cab between the overhang portion of the roof and the front viewing portion of the cab.

Embodiments of the present invention further comprise a method of communicating between a work machine and an attachment. The method comprises a step of coupling the attachment to the work machine. The attachment includes an identification module with a transmitter, and the work machine comprises a wireless receiver. The work machine includes a control station comprising a cab with a front side and roof. The front side of the cab includes a front viewing portion for the operator to view the attachment. The roof includes an overhang portion that extends forward from the front side of the cab to at least partially overhang the front viewing portion of the cab. The wireless receiver of the work machine is attached to the cab between the overhang portion of the roof and the front viewing portion of the cab. A further step includes transmitting identification information from the identification module of the attachment to the wireless receiver of the work machine.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described herein with reference to the following drawing figures, wherein.

Figure 1:
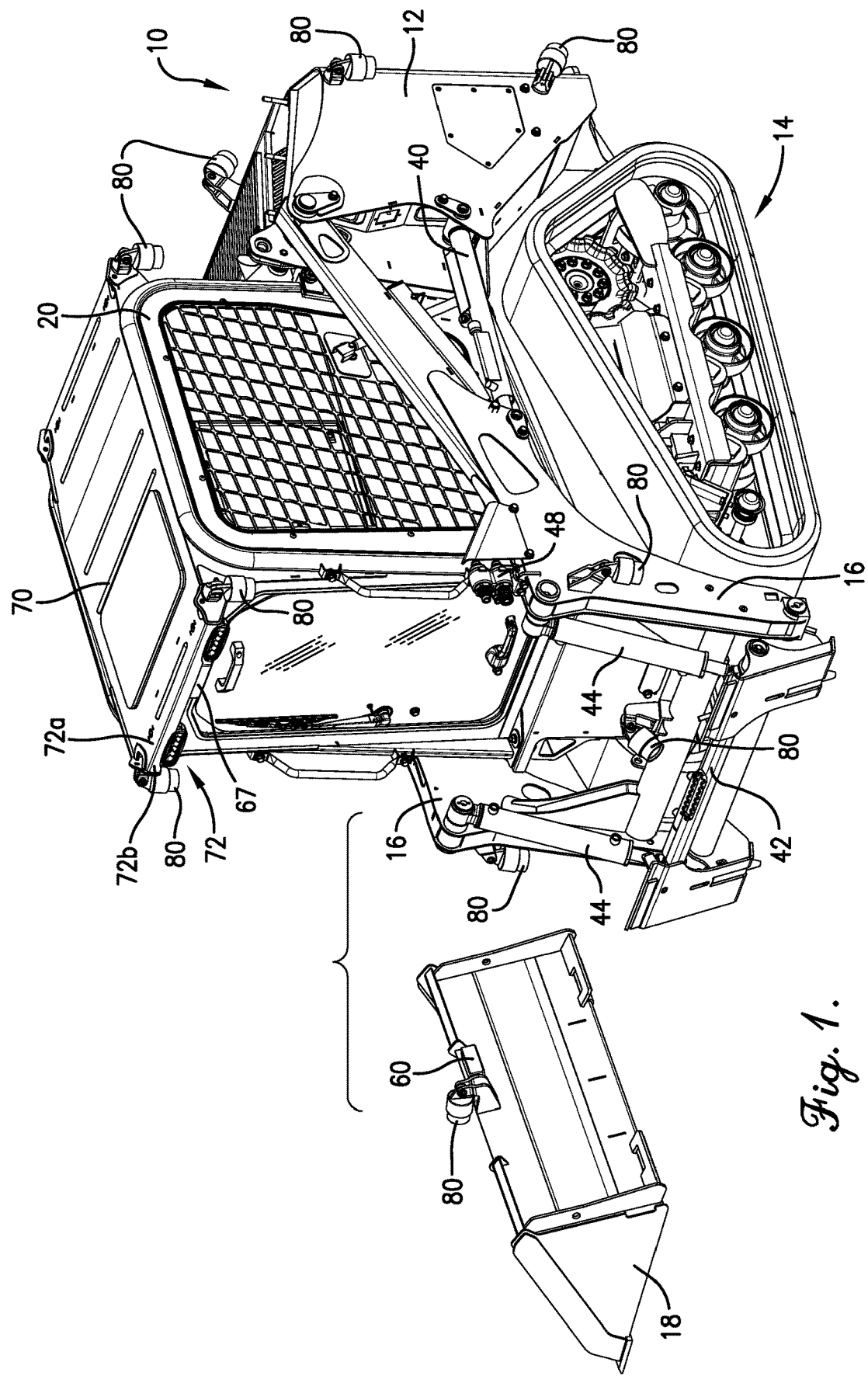
FIG. 1 is a perspective view of a system according to embodiments of the present invention comprising a work machine and an attachment with a tag configured to communicate with the work machine.
Figure 2:
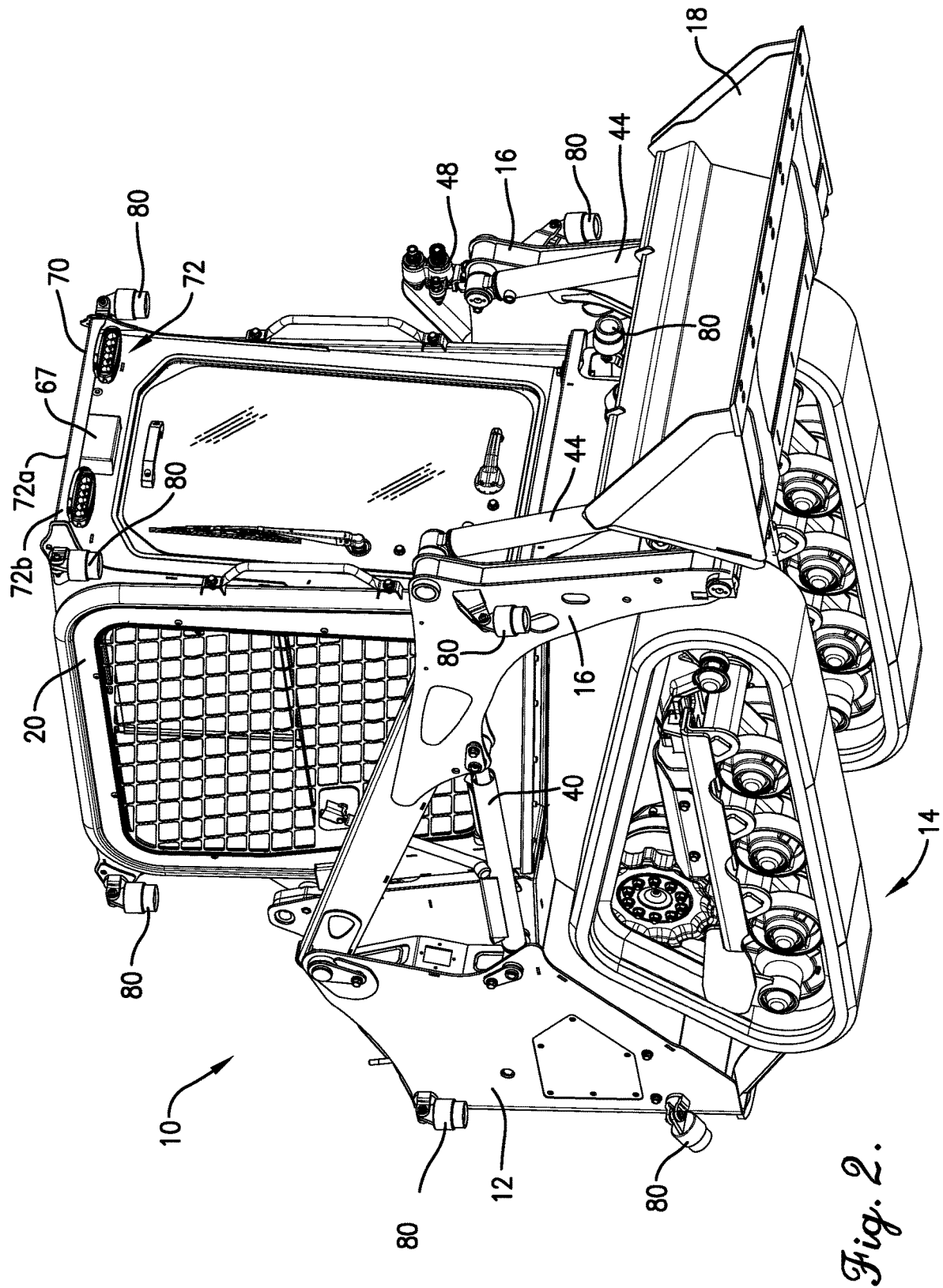
FIG. 2 is another perspective view of the system from FIG. 1, with the attachment coupled with the work machine.
Figure 3:
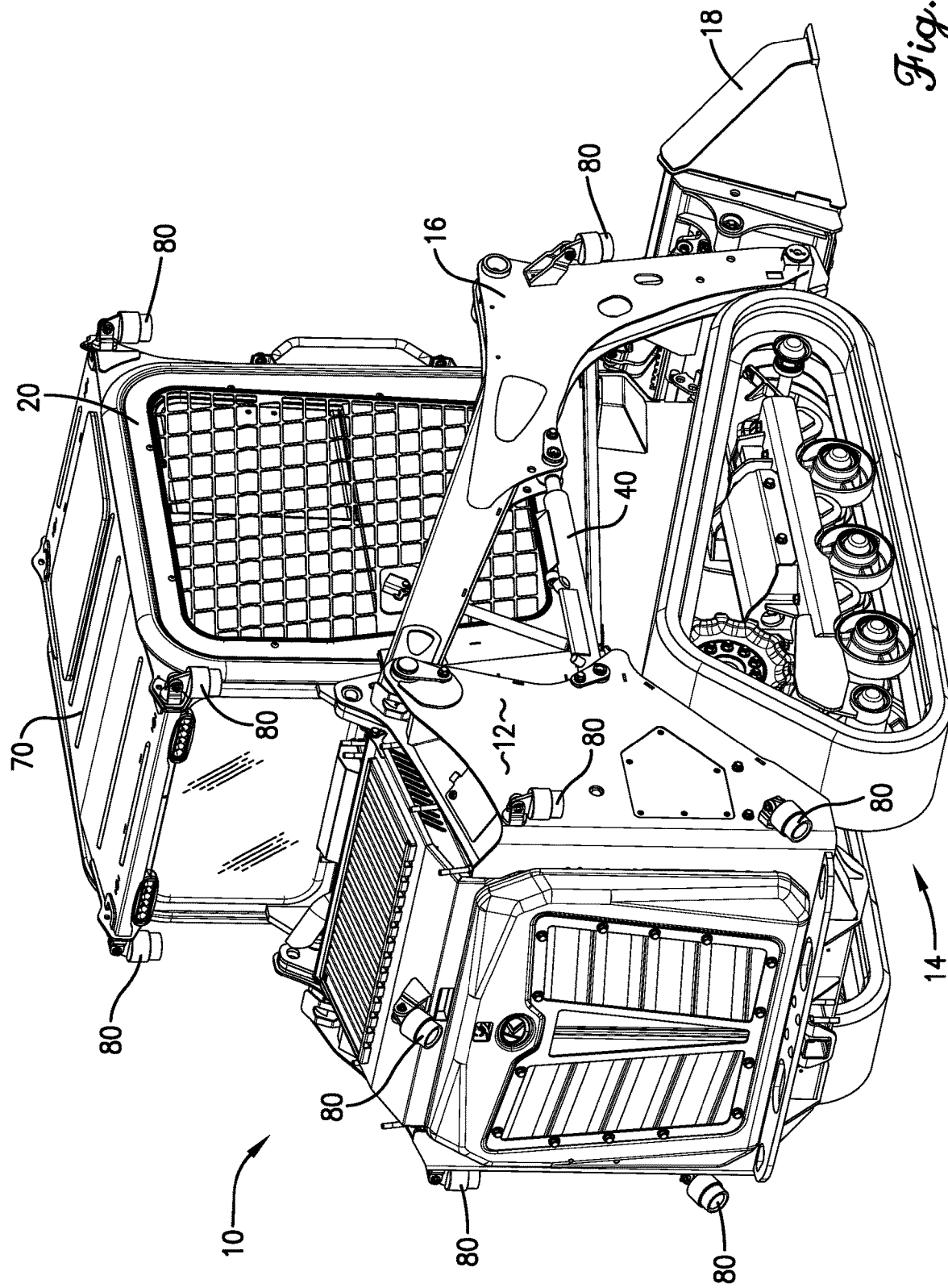
FIG. 3 is a rear perspective view of the system from FIG. 2.
Figure 17:
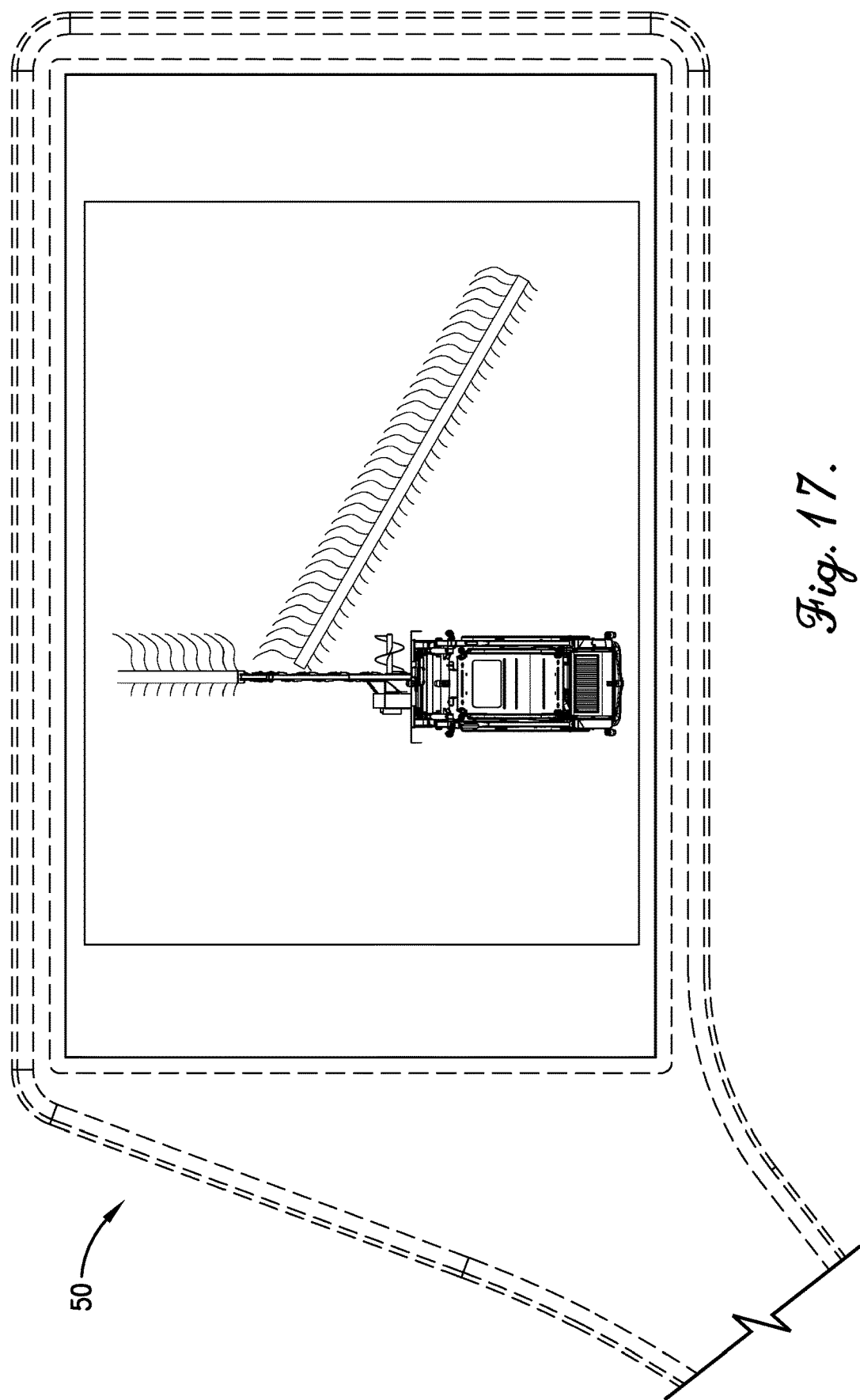

FIG. 17 is a view of a graphic display of the work machine from FIGS. 1-3, with the graphic display presenting a "bird's eye" image and/or video of the work machine obtained from two or more cameras positioned on the work machine and with the image and/or video overlaid with graphic elements representing portions of the work area; and FIG. 18 is a view of a graphic display of the work machine from FIGS. 1-3, with the graphic display presenting an image and/or video obtained from a camera positioned on an upper, front portion of the work machine;

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

General Overview

Embodiments of the present invention are directed to systems comprising a work machine and at least one attachment configured to be releasable secured to the work machine. The work machine may comprise various types of machines configured to support and operate attachments. For example, the work machines may include "compact utility loaders" or "CULs," "compact track loaders" or "CTLs," skid-steer loaders, or the like. However, the work machines may comprise various other types of machines configured to perform heavy-equipment or agricultural operations (e.g., excavators, wheeled loaders, dozers, tractors, etc.).

The work machines may be propelled by one or more wheels and/or endless tracks. FIGS. 1-3 illustrate a work machine 10 in the form of a track loader that is propelled by tracks. In general, the work machines will be self-propelled and will include one or more vertically-shiftable arms configured to support various interchangeable attachments (also known and referred to as "tools" or "implements"). The attachments may, in some embodiments, comprise tools that have hydraulically-operated auxiliary functions. Examples of such hydraulically-operated attachments include augers, grinders, jack hammers, tillers, rollers, sweepers, trenchers, digger derricks, cold mills, grapples, tree/post puller, power rake, or the like. In other embodiments, however, the attachments may comprise non-hydraulically-driven tools, such as buckets, blades, plows, knives, pallet forks, or the like.

Figure 4:
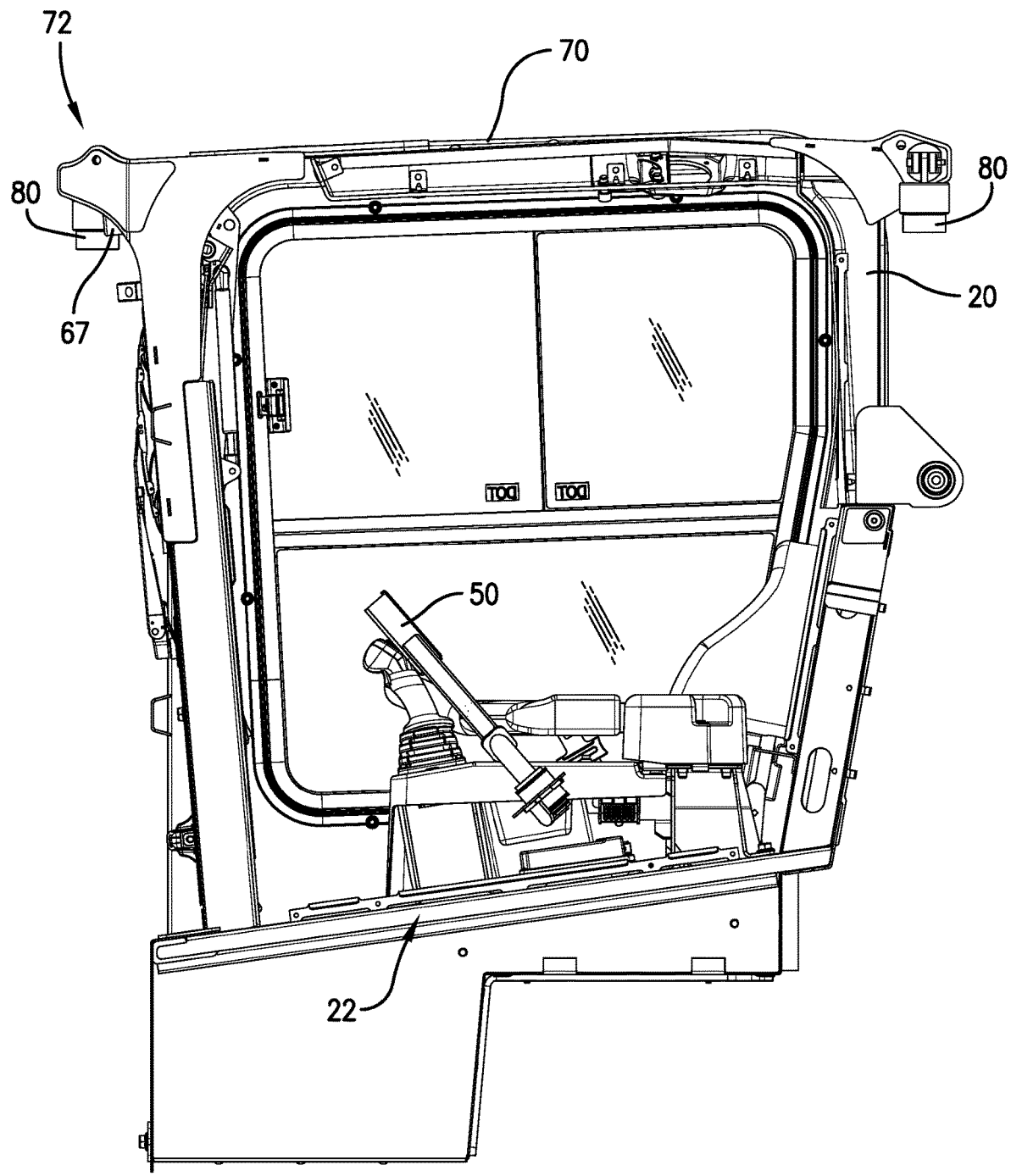
FIG. 4 is a side cross-section of a cab of the work machine from FIGS. 1-3.

Returning to the work machine 10 of FIGS. 1-3 in more detail, the work machine 10 may broadly comprise a frame 12 supported on the ground by a drive assembly 14, which is configured to propel the work machine 10 over the ground. The work machine 10 may additionally comprise one or more (e.g., a pair of) arms 16 supported by the frame 12 and configured to be raised and lowered. The arms 16 are further configured to support various types of attachments 18 for performing various types of work, as required by an operator of the work machine 10. The work machine 10 may include a control station, which may be in the form of a cab 20 (e.g., including a seat) or a platform from which the operator can control the work machine 10 and/or associated attachments 18. As such, embodiments may provide for the control station to include a seat on which the operator can sit or a platform on which the operator can stand. FIG. 4 illustrates a control station in the form of a cab 20 with a seat on which the operator can sit while operating the work machine 10 and/or the associated attachments 18. The control station may also include one or more user controls 22 (e.g., buttons, switches, levers, joysticks, graphic displays or touchscreens, etc.), which may be used to control various functions of the work machine 10 and/or the attachments 18.

As used herein, directional terms are used with respect to the perspective of an operator located within the control station and facing forward towards a front end of the work machine 10. Thus, the terms "front" and "forward" mean a longitudinal direction towards the front end of the work machine 10 (i.e., the front end of the work machine 10 is on the left side of the work machine 10 shown in FIG. 1). It is noted that the attachments 18 are generally supported at the front end of the work machine 10 via connection to front ends of the work machine's 10 arms 16. However, certain work machines may be configured to connect with attachments located at a back end of the work machine. The terms "back," "rear," or "rearward" mean a longitudinal direction towards the back end of the work machine (i.e., the rear end of the work machine 10 is on the right side of the work machine 10 shown in FIG. 1). The term "left" or "leftward" means a left lateral direction from the perspective of the operator positioned within the control station and facing forward, and the terms "right" or "rightward" means a right lateral direction from the perspective of the operator positioned within the control station and facing forward.

Figure 5:
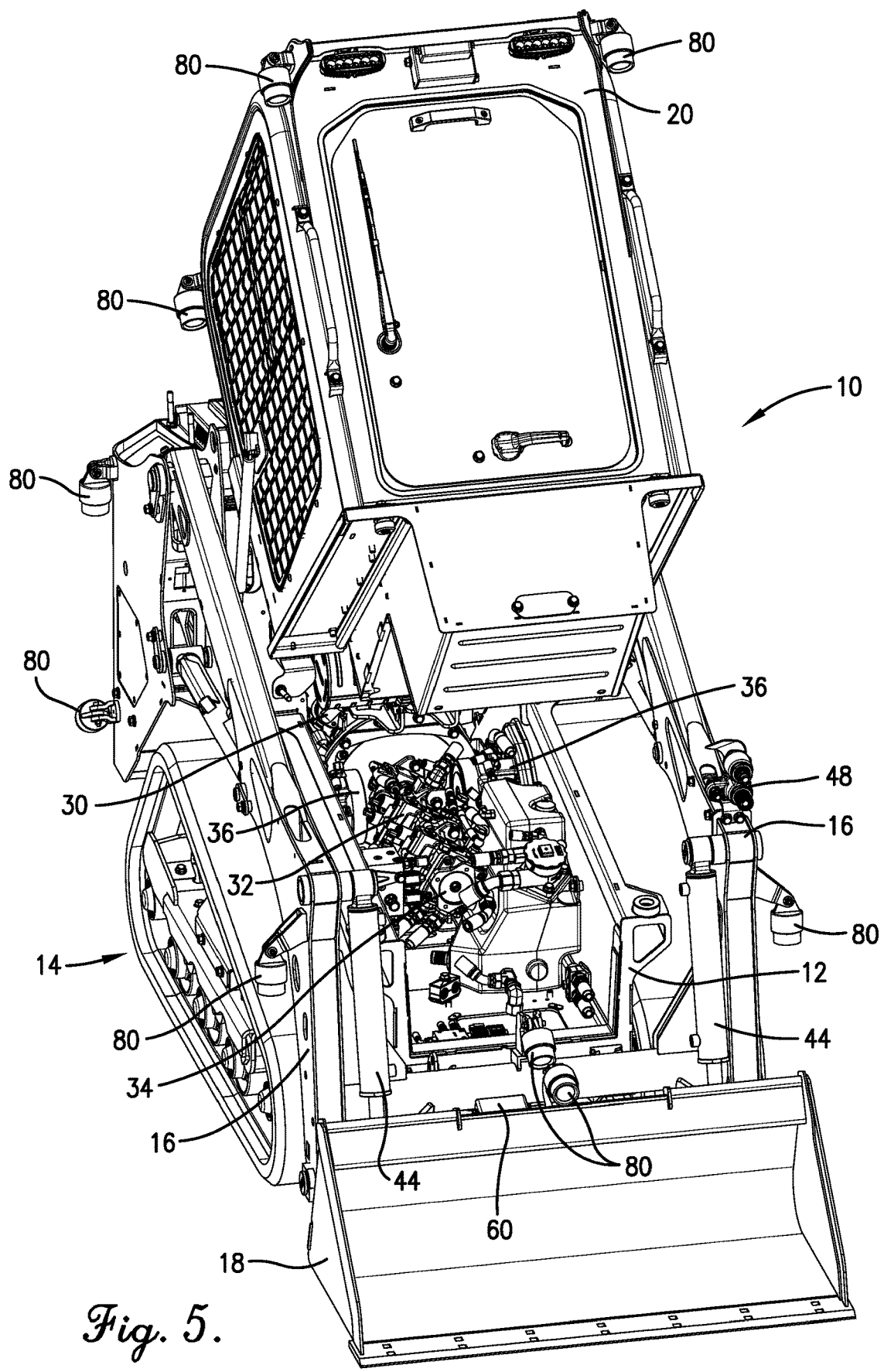
FIG. 5 is a front perspective view of the work machine from FIGS. 1-3, with a cab rotated upward to illustrate an engine and hydraulic system components of the work machine.

Returning to the work machine 10, and with reference to FIG. 5, the frame 12 may broadly form a housing that defines an interior compartment within which various components of the work machine (e.g., engine, hydraulic system, etc.) are housed and supported. In more detail, the interior compartment may house a combustion engine 30, a hydraulic auxiliary pump 32, and/or a hydrostatic transmission 34. The engine 30 may provide rotary power to each of the auxiliary pump and the hydrostatic transmission. As illustrated schematically in FIG. 6, the hydraulic auxiliary pump 32 and/or the hydrostatic transmission 34 may form part of the hydraulic system of the work machine 10. The auxiliary pump 32 may provide hydraulic power to raise and lower the arms 16 that support the associated attachments 18 (e.g., to raise and lower the attachments 18) and/or may provide hydraulic power to the attachments themselves 18 (e.g., for the case in which the attachments are hydraulically powered). The hydrostatic transmission 34 may provide hydraulic power to the work machine's 10 drive assembly 14.

In certain embodiments, the work machine 10 may include a pair of hydraulic drive motors 36 positioned on each side of the frame 12 within the interior compartment. Such drive motors 36 may be used to provide power to the drive assembly 14. Specifically, the hydrostatic transmission 34 may be configured to provide hydraulic power to the drive motors 36, which in turn provide rotary power to the drive assembly 14 of the work machine 10. As was noted previously, the work machine 10 may include endless tracks or wheels that propel the work machine 10 over the ground. Such tracks or wheels form part of the drive assembly 14 and which are driven by the drive motors 36.

Figure 6:
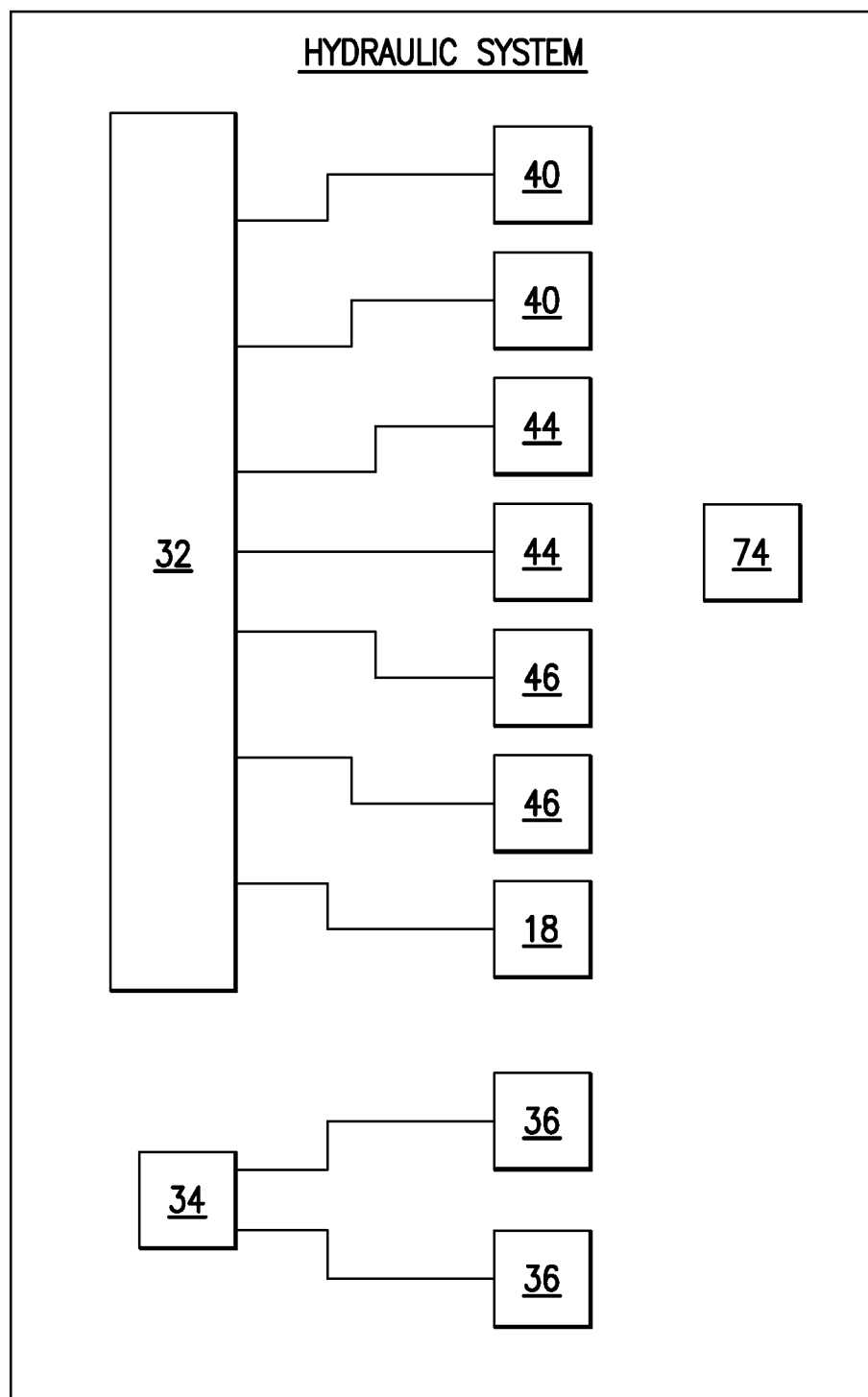
FIG. 6 is a schematic view of a hydraulic system of the work machine from FIGS. 1-3.

Turning to the arms 16 of the work machine 10, as shown in FIGS. 1-3, in some embodiments the arms 16 may comprise two arms in the form of a left arm (i.e., positioned on a left side of the work machine 10) and a right arm (i.e., positioned on a right side of the work machine 10). The arms 16 may each be raised and lowered via an arm actuator 40, which as shown in FIG. 6 may form part of the hydraulic system of the work machine 10. In some embodiments, the arm actuators 40 may comprise linear actuators, such as hydraulic cylinders (e.g., single or double-acting cylinders), pneumatic cylinders, and/or or electric linear actuators.

Each of the arms 16 may extend forward to a front end that supports a hitch plate 42, as shown in FIG. 1. Such hitch plate 42 may extend between the left and right arms 16 and may generally comprise a connection assembly configurable to releasably secure various types of attachments 18 to the arms 16 of the work machine 10. In some embodiments, one (or both) of the arms 16 may include a pitch actuator 44 and a roll actuator 46 (shown schematically in FIG. 6) that permit tilting of the hitch plate 42 and any attachment 18 coupled with the hitch plate 42. The pitch actuators 44 may permit the hitch plate 42 (and any attachment 18 coupled thereto) to rotate forward/rearward with respect to the arms 16 of the work machine 10. The roll actuators 46 can be used to permit the hitch plate 42 (and any attachment 18 coupled thereto) to rotate rightward/leftward with respect to the arms 16 of the work machine 10. The pitch and roll actuators 44,46 may comprise hydraulic cylinders (e.g., single or double-acting cylinders), pneumatic cylinders, and/or or electric linear actuators. As such, for example, if an attachment 18 in the form of a bucket is attached to the hitch plate 42, actuation of the pitch actuators 44 will permit the bucket to be tilted forward/rearward such as for selectively collecting and dumping of material. On the other hand, if an attachment 18 in the form of a plow is attached to the hitch plate 42, actuation of the roll actuators 46 will permit the plow to be tilted rightward/leftward as may be necessary to align the plow with the ground surface. As shown in FIG. 1, the front of the work machine 10 may also include a hydraulic coupling system 48 configured to hydraulically link the hydraulic system of the work machine 10 with a hydraulically-operated attachment 18 to provide hydraulic power to the attachment 18.

The work machine's 10 control station (e.g., the cab 20) may include a plurality of user controls 22 (e.g., buttons, switches, levers, joysticks, touchscreen displays, etc.), as shown in FIG. 4, that the operator can access and manipulate to control the work machine 10, the arms 16, and/or the attachment 18. Specifically, an operator may manipulate the user controls 22 to perform various functions of the work machine 10, such as (i) propelling and/or turning the work machine 10, (ii) raising/lowering the arms 16 and/or associated attachments 18, and/or (iii) operating any auxiliary functions of the associated attachments 18.

Figure 7:
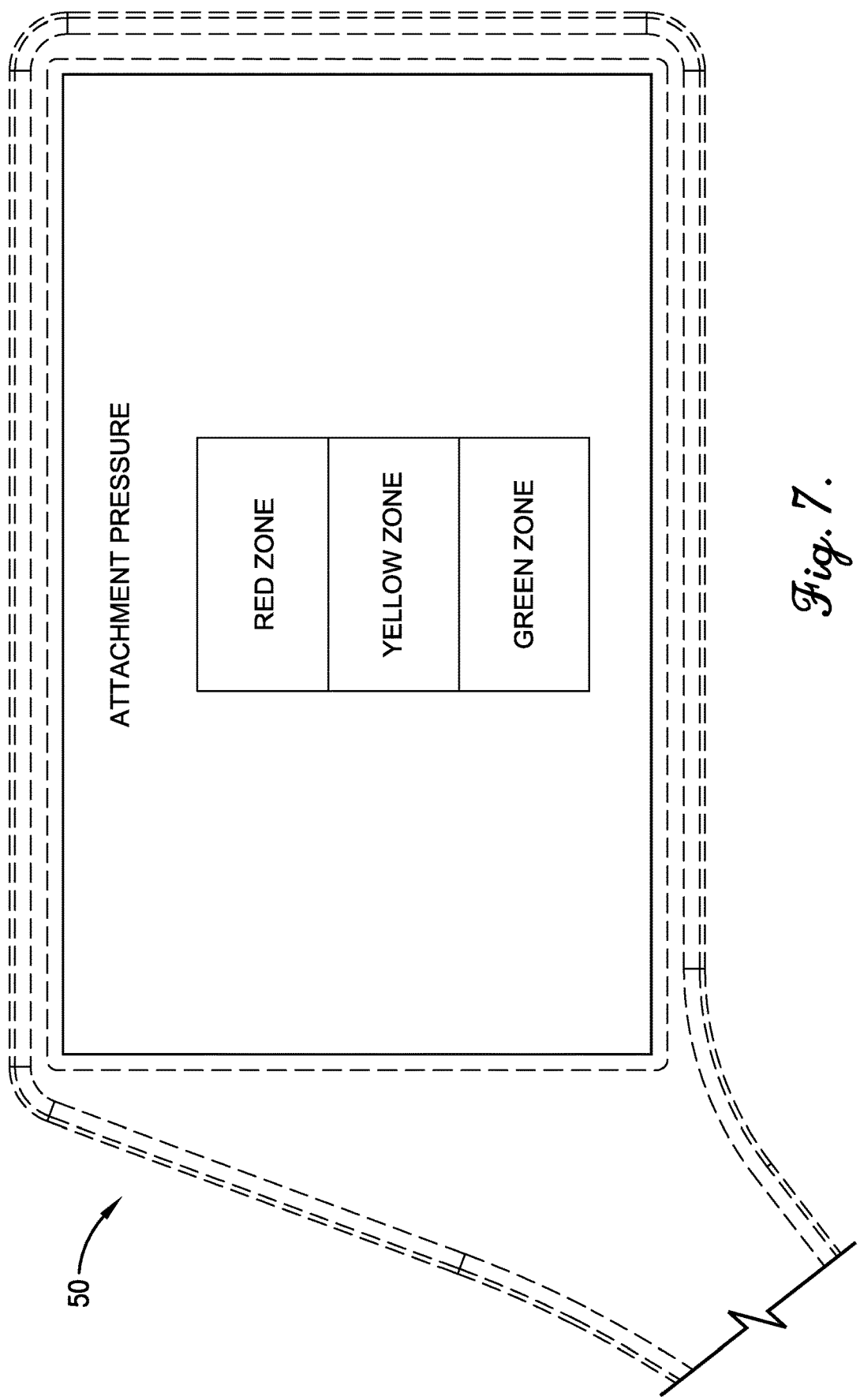
FIG. 7 is a view of a graphic display of the work machine from FIGS. 1-3, with the graphic display presenting a graphical user interface (GUI) configured to show an operator of the work machine information indicative of the current hydraulic pressure being provided to the attachment coupled with the work machine.

In certain embodiments, the user controls 22 may include a graphic display 50, such as illustrated in FIGS. 4 and 7. The graphic display 50 may comprise an electronic display, such as a cathode ray tube, liquid crystal display, plasma, or touch screen that is operable to display visual graphics, images, text, etc. In embodiments in which the graphic display 50 is a touchscreen, the operator can manipulate the graphic display 50 to control various aspects and/or functionalities of the work machine 10. The graphic display 50 may include, or may otherwise be associated with, one or more memory elements and processing elements. The memory elements may comprise non-transitory computer readable media and/or firmware, with a computer program stored thereon. The processing elements may comprise processors, CPUs, FPGAs, etc., which are configured to execute computer programs stored on the memory elements to perform various functions and features of the work machine 10. It should be understood that certain of the work machine's 10 functions and features discussed above and below may be performed by execution of the computer program by the processing elements of the graphic display 50. For example, the graphic display 50 may be configured to (by the processing elements executing the computer program stored on the memory elements) (i) obtain information from various components of the work machine 10 (e.g., via sensors, actuators, timers, clocks, etc.) so as to present such information to the operator via the graphic display 50, and (ii) receive instructions from the operator (e.g., via the graphic display 50 or other of the user controls 22) to control various operations of the work machine 10. The graphic display 50 may also present various graphic elements/icons and/or graphical user interfaces (GUIs) that provide information to the operator and/or that facilitate interaction and control of the work machine 10 by the operator. In embodiments in which the graphic display 50 is a touchscreen, the GUIs enable the operator to interact with the work machine 10 by touching or pointing at display areas of the GUI. In some other embodiments, the operator will interact with the GUIs and/or the work machine 10 by manipulating interactable graphic elements that are associated with the graphic display 50.

Figure 8:
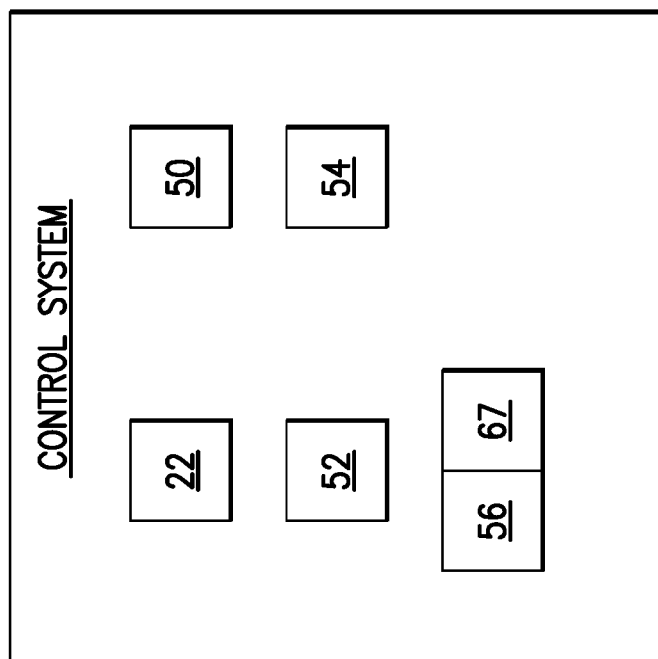
FIG. 8 is a schematic view of a control system of the work machine from FIGS. 1-3.

Alternatively, or in addition, the work machine 10 may include a control system, as shown schematically in FIG. 8, for controlling certain functionality of the work machine 10. Specifically, the control system may comprise one or more processing elements 52, one or more memory elements 54, and/or one or more communication elements 56. The processing elements 52 and/or memory elements 54 may be similar to (or the same as) the processing elements and/or memory elements discussed above with respect to the graphic display 50. Specifically, processing elements 52 may comprise one or more processors, CPUs, FPGAs, etc., which are configured to execute computer programs stored on the memory elements 54 to perform various functions and features of the work machine 10. The memory elements 54 may comprise non-transitory computer readable media and/or firmware, with a computer program stored thereon. As such, the memory elements 54 of the control system may comprise non-transitory storage media that includes one or more computer programs for carrying out various functions described herein. In some embodiments, the graphic display 50, and/or the user controls 22 more generally, may form part of the control system of the work machine.

The communication elements 56 may comprise various wired or wireless communication ports, receivers, transmitters, and/or transceivers (i.e., combination of receiver and transmitter), configured to send and receive information to/from various elements of the work machine 10 and/or the attachments 18 associated with the work machine 10. As such, the control system can receive information from elements of the work machine 10 and/or the attachments 18 associated with the work machine 10 and can control such elements (or different elements) based on such information. For example, as will be described in more detail below, the control system may obtain information from the hydraulic system of the work machine 10 (e.g., via the communication elements 56) and control the attachments 18 (e.g., via instructions generated by the processing elements 52 and/or memory elements 54 and sent via the communication elements 56) in response to such information. Wired communication may be facilitated by the communication element 56 via electrical/optical wires, cables, or the like. Wireless communication may be facilitated by the communication element 56 via RF transceivers, including via WiFi, Bluetooth, Cellular, or other similar protocols.

Pairing/Unpairing Attachments

Figure 9:
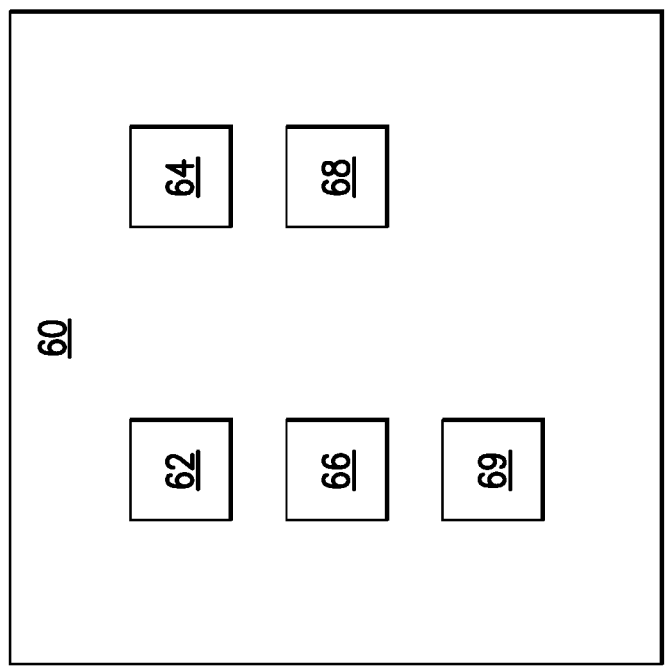
FIG. 9 is a schematic view of the tag of the attachment from FIGS. 1-3.

In certain embodiments, as discussed above, the work machine 10 may be configured to operably couple with (and decouple from) various types of attachments 18. To facilitate proper operation of each of the various types of attachments 18 to which the work machine 10 may be coupled, each of the attachments 18 may be associated with an identification (ID) module or tag 60, illustrated on the back of the attachment 18 of FIG. 1. Each tag 60 may be physically coupled to a particular attachment 18 (e.g., via fasteners, adhesives, or the like). The tag 60 is shown schematically in FIG. 9 and may comprise a self-contained unit in the form of a housing that encloses one or more processing elements 62, one or more memory elements 64, and a communication element 66. Starting with the communication element 66 of the tag 60, the communication element 66 may comprise a receiver, transmitter, and/or a transceiver (i.e., a combination of a receiver and transmitter) configured to send and/or receive wireless signals. Wireless communication may be facilitated by the communication element 66 via WiFi, Bluetooth, Cellular, or other similar protocols. Specifically, such communication element 66 may be configured to wirelessly communicate with the communication element 56 of the control system of a given work machine 10. Such communication element 56 of the work machine 10 may specifically comprise a wireless transceiver 67 (e.g., a combination of a receiver and transmitter, such as a Bluetooth transceiver) that is physically coupled with the work machine 10, as illustrated by FIGS. 1 and 2 and described in more detail below.

The tag 60 may also include a power source 68, such as a battery, which provides electrical power to various components of the tag 60 (in some embodiments, the battery may be rechargeable). The processing element 62 may comprise one or more processors, CPUs, FPGAs, etc., which are configured to execute computer programs stored on the memory element 64. The memory element 64 may comprise non-transitory computer readable media and/or firmware, with a computer program stored thereon (e.g., for carrying out various of the functions described herein). In some embodiments, the memory element 64 of a given tag 60 may store identification (ID) information that identifies the particular attachment 18 to which the tag 60 is coupled. In some embodiments, the ID information may comprise an alphanumeric code, a hex/hash code, or the like.

In certain embodiments, the tag 60 may additionally comprise a variety of sensors 69 such as accelerometers, global positioning system (GPS) receivers (or other position sensors), and/or various other sensors that may be beneficial in operating the associated work machine 10 and/or attachment 18. In some embodiments, the tag 60 may include at least three sensors 69 in the form of accelerometers, such that the tag 60 is configured to sense movement of the tag 60 (and, thus, the particular attachment 18 to which the tag 60 is coupled) in each of the three, physical space dimensions (e.g., −x, −y, and −z dimensions). In addition, the tag 60 may include a GPS receiver for determining the geographic location of the tag 60 on the Earth (and, thus, the geographic location of the particular attachment 18 to which the tag 60 is coupled).

To operably couple a particular attachment 18 with a work machine 10, the work machine 10 will approach the particular attachment 18 until the front ends of the work machine's 10 arms 16 (including the hitch plate 42) are adjacent to the attachment 18. The work machine 10 may include a hydraulic quick-attachment mechanism that actuates the hitch plate 42 into engagement with the implement 18 once the work machine 10 is positioned sufficiently close to the implement 18 for coupling. Upon the hitch plate 42 making contact with the particular attachment 18, such contact will impart an impact force onto the attachment 18 causing the attachment 18 and associated tag 60 to move or "jostle." Such jostling will be sensed by the accelerometers of the tag 60, which will cause the tag's 60 communication element 66 to wirelessly transmit the tag's 60 ID information stored in the memory elements 64. As noted above, such ID information is indicative of the particular attachment 18 to which the tag 60 is coupled. The transmitted ID information will be received by the wireless transceiver 67 associated with the control system of the work machine 10. As such, the work machine's 10 control system will be able to identify, based on the ID information transmitted from the tag 60, the particular attachment 18 to which the work machine 10 is being coupled. Upon identifying the particular attachment 18, the tag 60 of the particular attachment 18 will be communicatively coupled with the control system of the work machine 10, via the wireless transceiver 67 of the work machine 10, such that the particular attachment 18 and the work machine 10 are "paired." As such, the sensors 69 of the tag 60 may be used to determine the orientation of the tag 60 (and its associated attachment 18), the geographic location of the tag 60 (and its associated attachment 18), and whether the tags 60 associated attachment 18 is operably coupled with a work machine 10 or is disconnected from a work machine 10.

Notably, as illustrated in FIGS. 2 and 4, the wireless transceiver 67 of the work machine 10 may be physically coupled with the cab 20 of the work machine 10 at a location that (i) maximizes wireless communication coupling with the tag 60 of the particular attachment 18 that is intended to be operably coupled with the work machine 10, and (ii) reduces unintentional wireless communication coupling with tags 60 of other attachments 18 that are not intended to be operably coupled with the work machine 10. In more detail, as illustrated in FIGS. 1, 2, and 4, the wireless transceiver 67 of the work machine 10 may be coupled to a front portion of the cab 20, directly below a roof 70 of the cab 20. Specifically, the roof 70 of the cab 20 may be configured with an overhang portion 72 that extends forward from and/or overhangs a front side of the cab 20, with the front side of the cab perhaps including a front viewing portion for permitting the operator to view in a forward direction from the interior of the cab 20 so as to view the attachment 18. In some embodiments, the front viewing portion will comprise a clear window or windshield, which permits the operator to see through the front side of the cab 20. In some embodiments, the front viewing portion will comprise a main opening through which the operator can enter and exit the cab 20. The main opening may, in some embodiments, include a door that can be selectively opened and closed to provide access to the interior of the cab 20. Such a door may include a window or windshield through which the operator can see through the front side of the cab 20. Regardless, the overhang portion 72 may include a main panel 72(a) that extends generally coplanar or parallel with remaining portions of the roof 70 of the cab 20. The overhang portion 72 may also include a lip panel 72(b) that extends downward from a front of the main panel 72(a).

The wireless transceiver 67 may be physically coupled with the overhang portion 72 and/or with the front side of the cab 20, such that the wireless transceiver 67 is at least partially covered and/or enclosed by the overhang portion 72 and/or the front side of the cab 20. Specifically, the wireless transceiver 67 of the work machine 10 may be attached to the cab 20 between the overhang portion 72 of the roof 70 and the front viewing portion of the cab 20. For example, the wireless transceiver 67 may be coupled with the bottom surface of the main panel 72(a) of the overhang portion 72 and/or to the front surface of the front side of the cab 20.

As such, the overhang portion 72 and/or the front side of the cab 20 may at least partially block wireless signal propagation to/from back, top, and front portions of the wireless transceiver 67, with only the bottom portion of the wireless transceiver 67 presenting an open area for wireless signal propagation, as shown in FIG. 2. Thus, the overhang portion 72 can function as a wireless communication shield for the wireless transceiver 67 to inhibit wireless signals emitted from tags 60 associated with distant attachments 18 from being inadvertently received by the wireless transceiver 67. Instead, the wireless transceiver 67 will be particularly configured (i.e., via the open area in the wireless communication shield below the wireless transceiver 67) to communicate with a tag 60 associated with an attachment 18 that is positioned in close proximity to the work machine 10. It is further noted that the overhang portion 72 will also function as an environmental guard for the wireless transceiver 67, such as by protecting the wireless transceiver 67 from rain, wind, or other natural elements (e.g., a rain shield).

Thus, in view of the above, when a work machine 10 is coupling with an attachment 18, the tag 60 of the attachment 18 is configured to transmit ID information to the wireless transceiver 67 of the work machine 10, such that the work machine's 10 control system can use the ID information to improve the functionality of the work machine 10 and/or the attachment 18. In some embodiments, the work machine's 10 control system may store (e.g., in the memory elements 54) ID information associated with and/or that is indicative of a plurality of different attachments 18. In addition, the control system may store (e.g., in the memory elements 54) various attachment characteristics for each of the plurality of attachments 18. The attachment characteristics may each be associated with a particular attachment 18 (and/or may be associated with ID information for the particular attachment 18) and may include, for example: an attachment type, an attachment name, one or more attachment photographs (e.g., 2D or 3D graphical images), dimensions or sizes (e.g., length, width, height/depth) of the attachment, weight of the attachment, operating hydraulic pressure(s) for the attachment, operating hydraulic flow rate(s) for the attachment, operating positions/depths/angles for the attachment, usage information (e.g., hours used) for the attachment, and preferred camera angles/views during use of the attachment.

As noted above, the control system of the work machine 10 may associate ID information for a particular attachment 18 with a group of attachment characteristics for that particular attachment 18. As such, when a particular attachment 18 is being coupled with and/or paired with the work machine 10 (and thus the ID information for the particular attachment 18 is transmitted to the work machine 10), the work machine's 10 control system may determine the group of attachment characteristics for the particular attachment 18 based on the received ID information. However, in some alternate embodiments, the attachment characteristics of the particular attachment 18 may be stored on the tag 60 of the particular attachment 18, such that the attachment characteristics may be transmitted directly to the work machine 10 along with the ID information once the particular attachment 18 is coupled with the work machine 10. In still further embodiments, the attachment characteristics may be stored on remote computing devices (e.g., in the cloud), such that the work machine 10 is required to connect with the remote computing devices (e.g., over a wireless network) to obtain the attachment characteristics for a particular attachment 18 whenever such particular attachment 18 has been coupled with the work machine 10.

In some embodiments, certain of the attachment characteristics for the particular attachment 18 may be presented (e.g., via the graphic display 50) to an operator of the work machine 10, such that the operator can verify/approve that the particular attachment 18 is the correct/appropriate attachment being coupled with the work machine 10. In more detail, if an operator intends to operably connect a work machine 10 with an implement 18 in the form of a large bucket, and the operator has two buckets available (e.g., a large bucket and a small bucket), embodiments of the present invention permit the operator to verify/approve that the appropriate attachment 18 (i.e., the large bucket) is (or is being) coupled with the work machine 10. Specifically, as the work machine 10 approaches a first of the two buckets and jostles the first bucket, the ID information from the tag 60 associated with the first bucket will be transmitted to the wireless transceiver 67 of the work machine 10. The work machine's 10 control system will match the received ID information with the ID information stored in the control system of the work machine 10 to identify the first bucket. The control system may also identify the attachment characteristics associated with the ID information, with such attachment characteristics being related to the first bucket. In some embodiment, certain attachment characteristics associated with the ID information (and thus the first bucket) can be presented to the operator, such as on the graphic display 50 of the work machine 10. Specifically, the type, name, dimensions, and/or graphical image of the attachment 18 being coupled with (i.e., the first bucket) can be presented on the graphic display 50, such that the operator can (via the graphic display 50) verify that the first bucket is the large bucket that the operator intends to operably connect with the work machine 10. Upon verification, the operator can use the work machine 10 and the large bucket coupled therewith to perform necessary operations.

In contrast, if the type, name, dimensions, and/or graphical image of the first bucket presented on the graphic display 50 indicates the first bucket is the small bucket, the operator can decline to couple the first bucket with the work machine 10 and, instead, can couple the second bucket with the work machine 10. Such coupling of the second bucket can be performed in a similar manner to that discussed above. Specifically, as the work machine 10 approaches and jostles the second bucket, the ID information from the tag 60 associated with the second bucket will be transmitted to the work machine 10. The work machine's control system will compare the ID information with the plurality of ID information and associated attachment characteristics stored on the control system to identify the second bucket. In some embodiments, certain attachment characteristics associated with the ID information (and thus the second bucket) will be presented to the operator. For instance, the type, name, dimensions, and/or graphical image of the second bucket can be presented on the graphic display 50, such that the operator can (via the graphic display 50) verify that the second bucket is the large bucket that the operator intends to operably connect with the work machine 10. Upon verification, the operator can use the work machine 10 and the large bucket coupled therewith to perform necessary operations.

Upon completion of the necessary operations, the operator can decouple the implement 18 (e.g., the large bucket) from the work machine 10. In certain embodiments, the work machine 10 may generate a confirmation request, asking the operator (e.g., via the graphic display 50) if the operator intends to decouple the implement 18. If the operator confirms the intended decoupling, the decoupling may be completed. If the operator rejects the decoupling, the implement 18 may remain coupled with the work machine 10. In some embodiments, such confirmation request may be automatically generated upon the work machine's 10 hydraulic quick-attachment mechanism being activated so as to initiate the attachment 18 decoupling process.

Monitoring Auxiliary Pressures

As noted above, in some embodiments, attachment characteristics for a plurality of attachments may be stored on the memory elements 54 associated with the control system of the work machine 10. As such, the work machine 10 can present, e.g., via the graphic display 50, the attachment characteristics of a particular attachment 18 when the particular attachment 18 is coupled with the work machine 10 (i.e., after the ID information of the particular attachment 18 is transmitted from the tag 60 of the particular attachment 18 to the work machine 10).

Furthermore, certain embodiments of the present invention may be configured to utilize the attachment characteristics of a particular attachment 18 to allow for efficient operation of the particular attachment 18 by the work machine 10. In more detail, certain hydraulically-powered attachments 18 have preferred operating pressures (or pressure ranges) at which hydraulic pressure is to be supplied to the attachment 18 from the hydraulic system of the work machine 10. For instance, many attachments 18 have hydraulic motors, which are configured to rotate tools of the attachments 18. Examples of such attachments 18 include skid cutters, trenchers, planing attachments (e.g., for milling asphalt), snow blowers, augers, brooms, mulching heads, or the like. Such attachments 18 may have preferred operating pressures (or pressure ranges) at which hydraulic fluid is to be supplied to the attachments 18 from the hydraulic system of the work machine 10 to allow for efficient operation. The work machine 10 may provide such hydraulic fluid to the attachment via the work machine's auxiliary pump 32. Specifically, one or more hydraulic lines may extend from the auxiliary pump 32 to the work machine's 10 hydraulic coupling system 48 (see, e.g., FIG. 1). And the hydraulically-operated attachments 18 may themselves be hydraulically coupled to the hydraulic coupling system 48.

When a particular hydraulically-powered attachment 18 is operably coupled to a work machine 10, both mechanically (e.g., via the hitch plate 42 of the work machine 10) and hydraulically (e.g., via the hydraulic coupling system 48 of the work machine 10), the ID information for the particular attachment 18 will be transmitted from the particular attachment's 18 tag 60 to the work machine's 10 control system, as discussed previously. In addition, the control system will automatically identify, through use of the ID information, the particular attachment 18 and the associated attachment characteristics stored in the control system. Such attachment characteristics may include the preferred operating pressures (or pressure ranges) associated with the particular attachment 18.

During operation of the particular attachment 18 by the work machine 10, the control system of the work machine 10 may monitor the hydraulic pressure being supplied to the particular attachment 18 from the work machine's 10 hydraulic system. Specifically, for instance, the work machine 10 may include one or more pressure sensors 74 associated with the work machine's 10 hydraulic system (see, e.g., FIG. 6). Such pressure sensors 74 may be operably integrated with the auxiliary pump 32 or with the auxiliary hydraulic lines that supply hydraulic fluid from the auxiliary pump 32 to the particular attachment 18 (via the hydraulic coupling system 48 of the work machine 10). Specifically, the pressure sensors 74 may be associated with the auxiliary pump 32, valve, hydraulic fluid line, or similar component associated with the auxiliary circuit of the work machine's 10 hydraulic system.

The control system may compare the actual hydraulic pressure being provided to the particular attachment 18, as measured by the pressure sensor 74, with the preferred operating pressures (or pressure ranges) for the particular attachment 18, as determined from the attachment characteristics stored in the control system. If a difference (or a significant enough difference) exists, an alert may be generated for the operator to adjust certain aspects of the operation of the attachment 18 and/or of the work machine 10.

In more detail, each hydraulically-powered attachment 18 is generally configured to operate at a preferred operating pressure (or pressure range), and such preferred operating pressure (or pressure range) can be identified by the work machine's 10 control system when the attachment 18 is operably coupled with the work machine 10. Specifically, when the ID information of the attachment 18 is transmitted from the tag 60 of the attachment 18 to the work machine 10, the control system can obtain the preferred operating pressure (or pressure range) from the associated attachment characteristics stored in the memory elements 54 of the control system. In some other embodiments, the preferred operating pressure (or pressure range) of an attachment 18 may be transmitted directly from the tag 60 of the attachment 18 to the work machine 10, along with the ID information of the attachment 18.

Regardless, it is generally understood that operating an attachment 18 at a hydraulic pressure outside of the attachment's 18 preferred operating pressure (or pressure range) can be problematic (e.g., unsafe and/or inefficient). For example, if an attachment 18 in the form of a skid cutter is cutting vegetation (e.g., brush or trees) and enters a heavily vegetated area, the skid cutter can become overloaded, bog down, and go into relief (i.e., the hydraulic system of the work machine 10 will stop providing hydraulic power to the attachment 18 as a safety precaution). In such a situation, the operator of the work machine 10 is required to reverse the work machine 10 away from the heavily vegetated area and allow the hydraulic system of the work machine 10 time to reset (i.e., to permit the hydraulic system of the work machine 10 to restart so as to again provide hydraulic power to the attachment 18).

To prevent such issues of overloading and going into relief, the work machine's 10 control system is configured to alert the operator when the attachment 18 is operating outside of the attachment's 18 preferred operating pressure (or pressure range) or when the operating pressure of the attachment 18 is approaching the attachment's preferred operating pressure (or pressure range). Such alerts may be audible, visual, or tactile based alerts (or combinations thereof). For example, the alert may comprise an audible alert generated by a speaker located within the control station (e.g., the cab 20) of the work machine 10. Alternatively, the alert may comprise a visual alert generated by one or more lights (e.g., LEDs) or by the graphic display 50 located within the control station (e.g., the cab 20) of the work machine 10. As a further alternative, the alert may comprise a tactile alert generated by a motor within one or more of the user controls 22 (e.g., within the joysticks) situated within the control station (e.g., the cab 20) of the work machine 10, so as to provide a vibration-type alert to the operator of the work machine 10.

The alerts generated by the work machine 10 may be indications that one or more operating parameters of the work machine 10 need to be adjusted for proper and/or efficient operation of the work machine 10 and/or of the attachment 18 coupled with the work machine 10. Such operating parameters may comprise, for example, a travel speed of the work machine 10, a position/height of the arms 16 of the work machine 10 (and, thus, of the attachment 18 coupled to the arms 16), etc. The operating parameters may be adjusted manually by an operator of the work machine 10, or in some other embodiments, may be automatically adjusted by the control system of the work machine 10.

As a specific example, an attachment 18 in the form of a skid cutter may have a preferred operating pressure of 3500 pound per square inch (psi). As such, the hydraulic system of the work machine 10 will generally provide hydraulic power to the skid cutter at a preferred pressure range of between 3450 to 3550 psi (or from 1000 to 6000, from 2000 to 5000, and/or from 3000 to 4000 psi). However, if the operating pressure of the skid cutter begins to exceed the preferred pressure range (e.g., due to overloading), the hydraulic system of the work machine 10 will go into relief.

To prevent such issues, the control system of the work machine 10 may be configured to automatically establish operator alerts in the form of a "green zone," a "red zone," and/or a "yellow zone" alert. Broadly, the green zone alert will comprise an alert indicative of an operating pressure of the attachment 18 being within the preferred operating pressure range (i.e., the "green zone") for the attachment 18. So, for example, the green zone alert for the above-described skid cutter may be between 3475 and 3525 psi. The red zone alert will comprise an alert indicative of an operating pressure of the attachment 18 approaching (or being greater than) the upper end of the preferred operating pressure range (i.e., the "red zone") for the attachment 18. So, for example, the red zone alert for the above-described skid cutter may be between 3525 and 3550 (or greater). The yellow zone alert will comprise an alert indicative of an operating pressure of the attachment 18 approaching (or being less than) the lower end of the preferred operating pressure range (i.e., the "yellow zone") for the attachment 18. So, for example, the yellow zone alert for the above-described skid cutter may be between 3450 (or lower) and 3475.

During operation of a particular attachment 18, the control system will monitor the hydraulic pressure provided to the attachment 18 by the work machine's 10 hydraulic system (i.e., based on pressure measurements obtained by the pressure sensors 74) and determine whether the current operating pressure is within the "green zone," the "red zone," or the "yellow zone" for the particular attachment 18. As noted above, each attachment 18 may have a different preferred operating pressure (or pressure range); however, the control system is configured to automatically determine the preferred operating pressure (or pressure range) for the particular attachment 18 based on the attachment characteristics associated with the particular attachment 18 (as identified based on the ID information transmitted from the attachment's 18 tag 60 to the work machine 10). Furthermore, the control system is configured to generate the applicable "green zone," the "red zone," or the "yellow zone" alert for the particular attachment 18 based on the comparisons between the measured hydraulic pressure provided to the particular attachment 18 and the preferred operating pressure (or pressure range) for the particular attachment 18.

As such, if the actual pressure of the hydraulic fluid provided to the particular attachment 18 (as determined by the pressure sensor 74 associated with the work machine's 10 hydraulic system) is within the green zone, no alert may be provided to the operator of the work machine. However, in some embodiments, a green zone alert may be generated, which is an indication that the attachment 18 is operating in the green zone. The green zone alert may be provided to the operator to indicate that no adjustments are needed with respect to the work machine's 10 operating parameters. The green zone alert may include various types of alerts, such as: the activation of green-colored LED within the control station (e.g., the cab 20) of the work machine 10, or the graphic display 50 generating a green light or highlighting a "GREEN ZONE" graphical element/icon (see, e.g., FIG. 7).

On the other hand, if during operation of the work machine 10, the pressure of the hydraulic fluid provided to the particular attachment 18 is within the red zone, an alert may be generated and provided to the operator of the work machine 10 to notify the operator that the operating pressure of the attachment 18 is approaching the maximum operating pressure. Thus, such an alert (i.e., a red zone alert) may be provided as an indication that an operating parameter of the work machine 10 needs to be made to maintain proper and/or efficient operation of the work machine 10 and/or the attachment 18. As such, the operator may reduce the speed of the work machine 10, such that the attachment 18 does not require additional hydraulic pressure and the work machine's 10 hydraulic system does not reach the maximum operating pressure and go into relief. Alternatively, the operator may raise the height of the arms 16 and/or the attachment 18, such that the attachment 18 does not require additional hydraulic pressure and the work machine's 10 hydraulic system does not reach the maximum operating pressure and go into relief. Such an alert (associated with being within the red zone) may, as described above, be an audible, visual, or tactile alert. For example, an alert that the attachment 18 is operating in (or close to) the red zone may be provided to the operator, such as: the activation of red-colored LED within the within the control station (e.g., the cab 20) of the work machine 10, or the graphic display 50 generating a red light or highlighting a "RED ZONE" graphical element/icon (see, e.g., FIG. 7).

Similarly, if the pressure of the hydraulic fluid provided to the attachment 18 is within the yellow zone, an alert may be generated and provided to the operator of the work machine 10 to notify the operator that the operating pressure of the attachment 18 is approaching the minimum operating pressure. Thus, such an alert (i.e., a yellow zone alert) may be provided as an indication that an operating parameter of the work machine 10 needs to be made to maintain proper and/or efficient operation of the work machine 10 and/or the attachment 18. As such, the operator may increase the speed of the work machine 10, such that the attachment 18 can be provided with additional hydraulic pressure to operate more efficiently. Alternatively, the operator may lower the height of the arms 16 and/or the attachment 18, such that the attachment 18 requires additional hydraulic pressure to operate more efficiently. Such an alert (associated with being within the yellow zone) may, as described above, be an audible, visual, or tactile alert. For example, an alert that the attachment 18 is operating in (or close to) the yellow zone may be provided to the operator, such as: the activation of yellow-colored LED within the control station (e.g., the cab 20) of the work machine 10, or the graphic display 50 generating a yellow light or highlighting a "YELLOW ZONE" graphical element/icon (see, e.g., FIG. 7). In some embodiments, the alerts corresponding with each of the green zone, yellow zone, and red zone may be different (e.g., different audible sounds, different colored visual alerts, and/or different tactile feedbacks).

As was described previously, the work machine's 10 control system is configured to obtain the preferred operating pressure (or pressure range) for each attachment 18 that is coupled with the work machine 10 based on the ID information transmitted to the work machine 10 by the attachment's 18 tag 60. Thus, the control system is also configured to uniquely generate the applicable "green zone," the "red zone," or the "yellow zone" alert for each particular attachment 18 to which the work machine 10 is operably coupled. As such, embodiments of the present invention allow the operator of the work machine 10 to efficiently operate the work machine 10 regardless of what type of attachment 18 is being used. Although the above description was primarily related to attachments 18 with hydraulic motors that include hydraulically-driven, rotating tools/components, such alert features (i.e., generating applicable "green zone," "red zone," or "yellow zones" alerts) may also be applied to hydraulically-powered attachments 18 without motors, such as attachments with hydraulic cylinders powered by the hydraulic system of the work machine 10. For instance, if the work machine 10 is operably coupled with an attachment 18 in the form of a grapple that is actuated by hydraulic cylinders, the work machine's 10 control system can monitor the pressure of the hydraulic fluid supplied to the grapple to ensure that the appropriate clamping pressure of the grapple is being maintained by the grapple's hydraulic cylinders.

Creep Mode

In addition to providing alerts and/or indications to the operator of the work machine 10 as to the current operating pressure of the attachment 18 coupled to the work machine 10 (or an indication for the operator to adjust an operating parameter of the work machine 10), embodiments of the present invention may be configured to automatically adjust an operating parameter of the work machine 10. For example, the control system of the work machine 10 may be configured to automatically adjust the travel speed of the work machine at the appropriate speed for efficient operation of the attachment 18 and/or the work machine 10. In some embodiments, such speed control may be referred to as "creep mode," "creep control," or "creep speed," which is an automated adjustment to the travel speed of the work machine 10 when the work machine 10 is travelling at a low speed (e.g., less than 5 mph, less than 4 mph, less than 3 mph, less than 2 mph, and/or less than 1 mph) when performing a slow-moving operation such as trenching or milling with a hydraulically-operated attachment 18 such as a trencher or miller/cold planer.

In more detail, as was described previously, certain hydraulically-powered attachments 18 are configured to be powered at preferred operating pressures (or pressure ranges) by the work machine's 10 hydraulic system. For example, an attachment in the form of a trencher or cold planer includes a hydraulic motor that actuates to rotate tool elements as the work machine 10 is propelled forward/rearward. However, if the work machine 10 has a travel speed that is too fast, the attachment 18 can become overloaded, which as discussed previously can lead to overloading of the work machine's 10 hydraulic system and the potential for the work machine 10 to go into relief. On the other hand, if the work machine 10 travels too slow, the attachment 18 may not be working as efficiently as it could be if the work machine 10 was traveling at a faster speed. As such, embodiments of the present invention are configured to automatically control the travel speed of the work machine 10 based on the preferred operating pressure (or pressure range) of the particular attachment 18 that is coupled with the work machine 10.

In more detail, upon a particular attachment 18 being coupled with a work machine 10, the tag 60 associated with the particular attachment 18 will transmit ID information to the work machine 10, as was previously described. Based on the ID information, the control system of the work machine 10 will determine various attachment characteristics for the particular attachment 18, including the preferred operating pressure (or pressure range) of the particular attachment 18. During operation of the work machine 10 and the attachment 18, the hydraulic system of the work machine 10 will be configured to provide hydraulic fluid to the attachment 18 at the attachment's 18 preferred operating pressure (or pressure range). However, the hydraulic pressure at which the hydraulic fluid is provided to the particular attachment 18 may vary depending on the speed at which the work machine 10 (and thus the attachment 18) is travelling and/or the current work load the attachment 18 is experiencing. As such, embodiments of the present invention are configured to automatically adjust the travel speed of the work machine 10 based on the current pressure of the hydraulic fluid being provided from the work machine 10 to the attachment 18.

Specifically, the control system of the work machine 10 is configured to constantly monitor the pressure of the hydraulic fluid being provided by the work machine's 10 hydraulic system to the particular attachment 18, e.g., via pressure sensors 74 integrated with the auxiliary pump 32, valve, hydraulic fluid line, or similar component associated with the auxiliary circuit of the work machine's 10 hydraulic system. If the control system determines that the pressure of the hydraulic fluid being supplied to the particular attachment 18 is higher than the preferred operating pressure (or pressure range) for the attachment 18, the control system will automatically reduce the work machine's 10 travel speed (e.g., by reducing the hydraulic power provided to the work machine's drive motors 36 via the hydrostatic transmission 34) until the pressure of the hydraulic fluid being supplied to the particular attachment 18 is equal (or approximately equal) to the preferred operating pressure (or pressure range) for the attachment 18. Alternatively, if the control system determines that the pressure of the hydraulic fluid being supplied to the particular attachment 18 is lower than the preferred operating pressure (or pressure range) for the attachment 18, the control system will automatically increase the work machine's 10 travel speed (e.g., by increasing the hydraulic power provided to the work machine's 10 drive motors 36 via the hydrostatic transmission 34) until the hydraulic pressure being supplied to the particular attachment 18 is equal (or approximately equal) to the preferred operating pressure (or pressure range) for the attachment 18.

In some embodiments, the travel speed adjustments made by the control system will be accomplished using electronic over hydraulic (E over H) controls between the control system and the hydrostatic transmission 34. In some other embodiments, the travel speed adjustments may be made via a hydraulic control system that incorporates feed-back, feed-forward, and/or proportional gain feedback loops between the operating pressure being supplied from the work machine 10 to the attachment 18 and the travel speed of the work machine 10 (e.g., perhaps incorporating use of proportional hydraulic valves). The control system may use plots of travel speed vs. operating pressures to make the necessary adjustments to the work machine's 10 travel speed. Such plots may be unique for each attachment 18 and may be stored within the control system as part of the attachment characteristics.

Notably, such adjustments to the travel speed of the work machine 10 can be made automatically by the work machine's 10 control system without direct intervention by the operator. Furthermore, the control system is configured to make such travel speed adjustments uniquely based on the hydraulic pressure requirements of the particular attachment 18 that is coupled with the work machine 10. As was described previously, the work machine's 10 control system is configured to obtain the preferred operating pressure (or pressure range) for each attachment 18 that is coupled with the work machine 10 based on the ID information transmitted to the work machine 10 by the attachment's 18 individual tag 60 when the particular attachment 18 is coupled with the work machine 10. Finally, given such differences in preferred operating pressures between various hydraulically-operated attachments 18, it should be understood that when plotting curves of travel speed vs. operating pressures, the curves for various attachments 18 will likely be significantly different.

Adjusting Hydraulic Flow Rates

In addition to preferred operating pressures (or pressure ranges), most hydraulically-powered attachments also have a preferred operating hydraulic flow rate (or flow rate range). Such a preferred operating flow rate for a particular attachment 18 is "preferred" because it is the flow rate with which the particular attachment 18 can operate efficiently and safely. For instance, if a particular attachment 18 is configured to efficiently operate a given flow rate, it may be dangerous to provide the particular attachment 18 with hydraulic fluid at a flow rate higher than the given flow rate because such higher flow rate may damage the particular attachment 18. Additionally, it may be inefficient to provide the particular attachment 18 with hydraulic fluid at a flow rate lower than the given flow rate because such lower flow rate may cause the particular attachment 18 to not operate at its optimal capacity. Embodiments of the present invention overcome such issues, as described in more detail below.

Embodiments of the present invention are configured to automatically set the flow rate of hydraulic fluid provided from the work machine's 10 hydraulic system (i.e., from the auxiliary pump 32, valve, hydraulic fluid line, or similar component associated with the auxiliary circuit of the hydraulic system) to a particular attachment 18 based on the requirements of the particular attachment 18 coupled with the work machine 10. In more detail, upon a particular attachment 18 being coupled with a work machine 10, the tag 60 associated with the particular attachment 18 will send the ID information to the work machine's 10 control system, as was previously described. Based on the ID information, the control system of the work machine 10 will determine various attachment characteristics for the particular attachment 18, including the preferred operating hydraulic flow rate (or flow rate range) of the particular attachment 18. During operation, the hydraulic system of the work machine 10 will be configured to automatically provide hydraulic fluid to the particular attachment 18 at the particular attachment's 18 preferred operating hydraulic flow rate (or flow rate range).

Although each separate attachment 18 may have an individual preferred operating hydraulic flow rate (or flow rate range), the work machine 10 may be configured to provide hydraulic fluid to attachments 18 at various flow rates to achieve the preferred operating hydraulic flow rate (or flow rate range) of the particular attachment 18 to which the work machine 10 is operably coupled. In some embodiments, the work machine 10 may be configured to provide hydraulic fluid at two or more flow rates, including a standard flow rate and a high flow rate. For example, the standard flow rate may be between 10 and 25 gallons per minute, whereas the high flow rate may be between 25 and 50 gallons per minute. In still other embodiments, the work machine 10 may be configured to provide hydraulic fluid at more than two flow rates, such as five or more flow rates, ten or more flow rates, fourteen or more flow rates, or fifteen or more flow rates. In such instances, the particular flow rate (from the multiple different flow rates the work machine 10 is capable of providing) that is actually provided to a particular attachment 18 (to which the work machine 10 is operably coupled) will be the same or slightly less than the preferred flow rate of the particular attachment 18, as identified by the attachment characteristics of the particular attachment 18. Thus, upon a particular attachment 18 being coupled with a work machine 10 (and the ID information of the particular attachment 18 transmitted from the tag 60 of the attachment 18 to the work machine 10) the control system of the work machine 10 will be configured to identify the preferred flow rate for the particular attachment 18 and to provide hydraulic fluid to the particular attachment 18 at the preferred flow rate.

Figure 10:
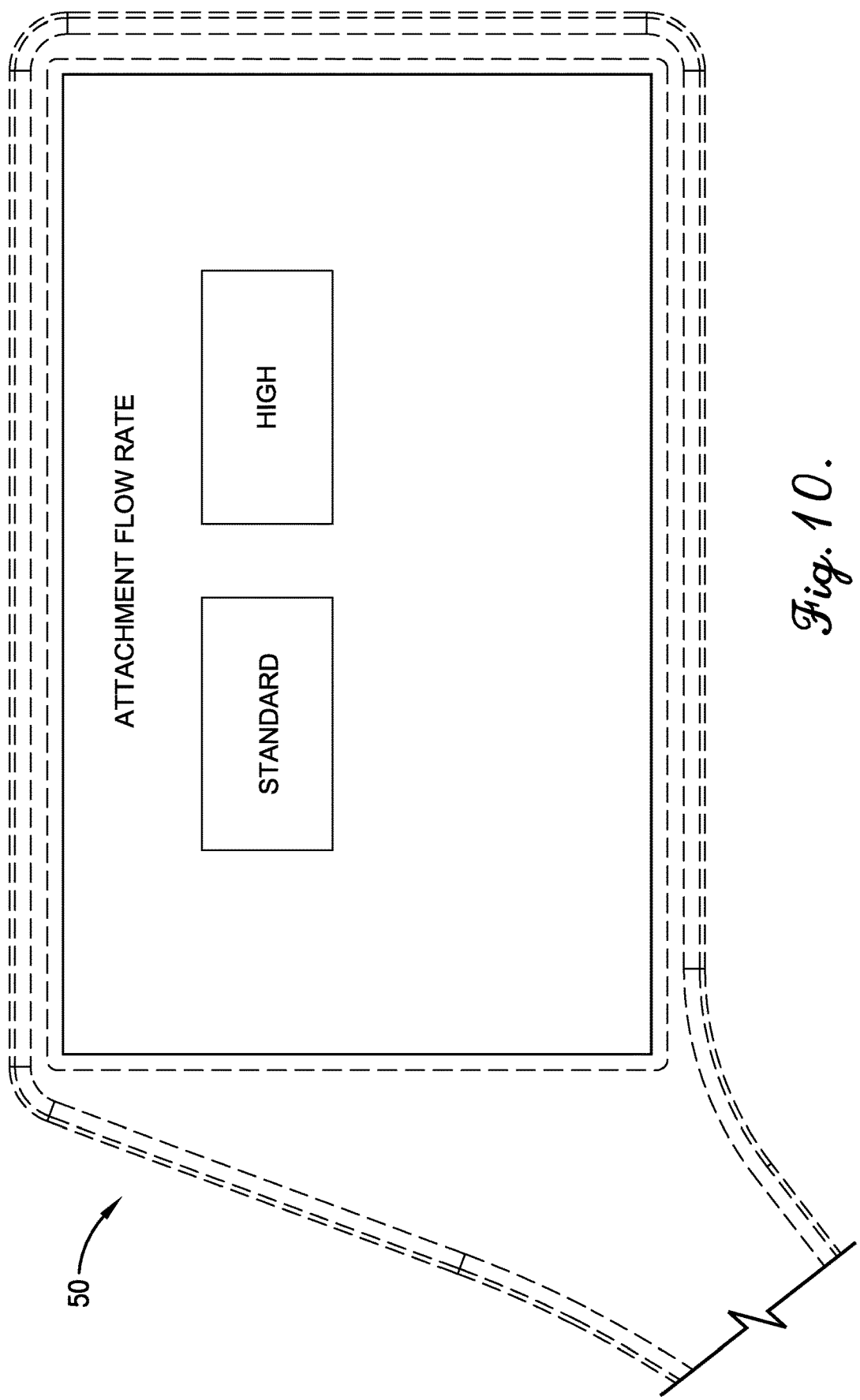
FIG. 10 is a view of a graphic display of the work machine from FIGS. 1-3, with the graphic display presenting a GUI configured to show an operator of the work machine hydraulic flow rate options for hydraulic fluid to be provided to the attachment coupled with the work machine.

In some additional embodiments, the control system of the work machine 10 may also present, via the graphic display 50, the preferred flow rate for the particular attachment 18. As such, the operator can visually confirm that the preferred flow rate for the particular attachment 18 coupled with the work machine 10 is going to be provided (or is currently being provided) to the attachment 18. For example, as illustrated in FIG. 10, if the work machine 10 is configured to provide two different flow rates to the attachments 18 (e.g., a standard flow rate and a high flow rate), the control system may generate a GUI presented on the graphic display 50 that presents a graphic element for each of the different, optional flow rates (e.g., a box-shaped icon with the word "STANDARD" included therein representative of a standard flow rate, and a box-shaped icon with the word "HIGH" included therein representative of a high flow rate). In addition, the particular graphical element that is indicative of the preferred operational flow rate that is to be provided (or is currently being provided) to the attachment 18 may be highlighted. For example, if the control system determines that the high flow rate is the preferred operating flow rate of the particular attachment 18 coupled to the work machine 10, the control system may highlight the "HIGH" graphic element of the GUI, such that the operator can visually verify the flow rate that is going to be (or that is currently being) provided to the attachment 18.

In some additional embodiments, before the work machine 10 will provide hydraulic fluid to a particular attachment 18 at the particular attachment's 18 preferred operating flow rate (as identified by the control system based on the attachment characteristics of the particular attachment 18), the operator may need to manually confirm that the preferred operating flow rate should be provided to the attachment 18. For example, one or more different flow rates may be presented on the GUI of the graphic display 50 (see, e.g., FIG. 10), with the preferred operating flow rate being highlighted. In some embodiments, the operator may be required to confirm the selection of the preferred operating flow rate, e.g., by the operator touching the graphic element displayed on a GUI presented on the graphic display 50 that corresponds with the preferred operating flow rate (particularly when the graphic display 50 is in the form of a touchscreen). Upon confirming that the preferred operating flow rate should be supplied to the particular attachment 18, the control system of the work machine 10 may supply hydraulic fluid to the particular attachment 18 at the preferred operating flow rate. As an example, if the control system determines that the preferred operating flow rate of a particular attachment 18 is a high flow rate, then the GUI presented on the graphic display 50 may include a graphic element indicative of the high flow rate (e.g., a box icon with the word "HIGH" included therein, as shown in FIG. 10). The operator may then confirm that the high flow rate should be supplied to the particular attachment by touching the box icon with the word "HIGH" included therein. Upon making such a confirmation, the control system of the work machine 10 may cause hydraulic fluid to be provided to the particular attachment 18 at the preferred operating flow rate (i.e., the high flow rate).

In some additional embodiments, the work machine 10 may be configured to provide hydraulic fluid to a particular attachment 18 at a flow rate that is different from the particular attachment's 18 preferred operating flow rate. For example, upon a particular attachment 18 being coupled with a work machine 10 (and the ID information of the particular attachment 18 transmitted from the tag 60 of the attachment 18 to the work machine 10) the control system of the work machine 10 may determine that the particular attachment 18 is configured to operate at a preferred operating flow rate that is the high flow rate. However, in some embodiments, the operator may wish to provide hydraulic fluid to the particular attachment at a standard flow rate, which is different (e.g., lower) than the identified preferred operating flow rate. As such, the operator may select which particular flow rate the operator wishes to provide to the attachment 18 for most efficient (or otherwise preferential) operation. Alternatively, upon a particular attachment 18 being coupled with a work machine 10 (and the ID information of the particular attachment 18 transmitted from the tag 60 of the attachment 18 to the work machine 10) the control system of the work machine 10 may determine that the particular attachment 18 is configured to operate at a preferred operating flow rate that is the standard flow rate. However, in some embodiments, the operator may wish to provide hydraulic fluid to the particular attachment at a high flow rate, which is different (e.g., higher) than the identified preferred operating flow rate. As such, the operator may select which particular flow rate the operator wishes to provide to the attachment 18 for most efficient (or otherwise preferential) operation.

In more detail, the control system of the work machine 10 may identify a preferred operating flow rate for a particular attachment 18. However, multiple different flow rates (which the work machine 10 is capable of providing) may be presented on the GUI of the graphic display 50. For example, the preferred operating flow rate may be in the form of a standard flow rate, an indication of which is presented on the graphic display 50 by way of a graphic element (e.g., a box-shaped icon with the word "STANDARD" included therein). However, the graphic display may also present another flow rate that may be optionally provided to the particular attachment 18. For example, the optional flow rate may be a high flow rate. The control system may present an indication of the optional flow rate on the graphic display 50 by way of a graphic element (e.g., a box-shaped icon with the word "HIGH" included therein). The control system may initially provide an indication that the preferred operating flow rate for the particular attachment 18 (i.e., the standard flow) is to be provided to the particular attachment (e.g., by highlighting the "STANDARD" box icon). However, the control system may subsequently receive an instruction from the operator (e.g., via the graphic display 50) to operate at the high flow rate. In such an instance, the control system may provide an indication to the operator (e.g., via the graphic display 50) that the selected operating flow rate is greater than the preferred operating flow rate for the attachment 18. The control system may also request (via the graphic display 50) that the operator confirm the intent to operate at the selected, high flow rate. Upon receiving the confirmation from the operator, the work machine 10 may provide hydraulic fluid to the attachment at the selected, high flow rate. The operator's selection of the high flow rate may be confirmed by the operator touching the graphic element displayed on a GUI presented on the graphic display 50 indicative of the high flow rate (e.g., a box icon with the word "HIGH" included therein). In contrast, if the operator does not wish to operate the attachment 18 at the high flow rate, the operator may select (e.g., by touching the GUI) a graphic element presented on the graphic display 50, with the graphic element indicative of the standard flow rate (e.g., a box icon with the word "STANDARD" included therein). Upon receiving the confirmation from the operator, the work machine 10 may provide hydraulic fluid to the attachment at the selected, standard flow rate.

In view of the above, the flow rate of the hydraulic fluid provided from the hydraulic system of the work machine 10 to the attachment may be controlled (directly or indirectly) by the controls system of the work machine 10. For example, upon a particular attachment 18 being coupled with a work machine 10, the tag 60 associated with the particular attachment 18 will send the ID information to the work machine's 10 control system. Based on the ID information, the control system of the work machine 10 will determine the preferred operating hydraulic flow rate (or flow rate range) of the particular attachment 18. In some embodiments, the preferred operating flow rate may be presented on the graphic display 50 of the work machine 10 for visual confirmation by the operator. At such time, the control system may provide for the hydraulic system of the work machine 10 to automatically provide hydraulic fluid to the particular attachment 18 at the particular attachment's 18 preferred operating hydraulic flow rate (or flow rate range). However, in some embodiments, the control system will be configured to require the operator to confirm that hydraulic fluid should be provided to the particular attachment 18 at the preferred operating flow rate before such hydraulic fluid will be provided from the work machine 10 to the particular attachment 18 (e.g., by the operator selecting the appropriate graphic element on the graphic display 50). In some alternative embodiments, the control system may be configured to permit the operator to manually adjust the flow rate to be supplied from the work machine 10 to the attachment 18, such that the provided flow rate is different from the preferred operating flow rate (e.g., by the operator selecting a different flow rate via the graphic display 50). Thereafter, the control system may instruct the hydraulic system of the work machine 10 to provide hydraulic fluid to the attachment 18 at the operator-identified flow rate (perhaps after requiring the operator to confirm).

Although the above description (i.e., detailing how to control the flow rates of hydraulic fluid supplied to attachments 18 from the hydraulic system of the work machine 10) is generally related to hydraulically-powered attachments 18 with hydraulic motors that are configured to drive rotating tools/components, such processes may also be applied to attachments 18 without motors. Those other attachments 18 may include hydraulic cylinders powered by the hydraulic system of the work machine. For instance, if the work machine 10 is operating a grapple, the work machine's 10 control system can identify and provide a preferential flow rate to the grapple. Providing such preferential flow rate to attachments 18 that operate via cylinders may help prevent overheating. Specifically, prior art designs commonly use orifices on cylinders to slow hydraulic flow; however, such orifices can cause the hydraulic fluid to heat up to increased temperatures. Thus, using preferential flow rates can reduce overheating associated with such prior art systems by avoiding the use of orifices that can lead to overheating.

Position Sensing

In some embodiments, the tags 60 associated with the attachments 18 may be used by the associated work machine 10 to sense and to aid in controlling the operating angles and/or positions of the attachments 18. In more detail, upon coupling a particular attachment 18 with a work machine 10, the tag 60 associated with the particular attachment 18 will become paired with the work machine 10 (i.e., communicatively coupled via the wireless connection between the tag 60 and the control system of the work machine 10), as was previously described. Such pairing will be maintained throughout operation of the particular attachment 18, until the attachment 18 is uncoupled from the work machine 10. Furthermore, after the initial pairing, the tag 60 may be configured to provide continuous angle and/or position data to the work machine's 10 control system. Such angle and/or position data may be used by the operator of the work machine 10 to accurately control operation and/or positioning of the attachment 18 and/or the work machine 10. Alternatively, or in addition, such angle and/or position data may be used by the control system of the work machine 10 to automatically control operation and/or positioning of the attachment 18 and/or the work machine 10.

Figure 11:
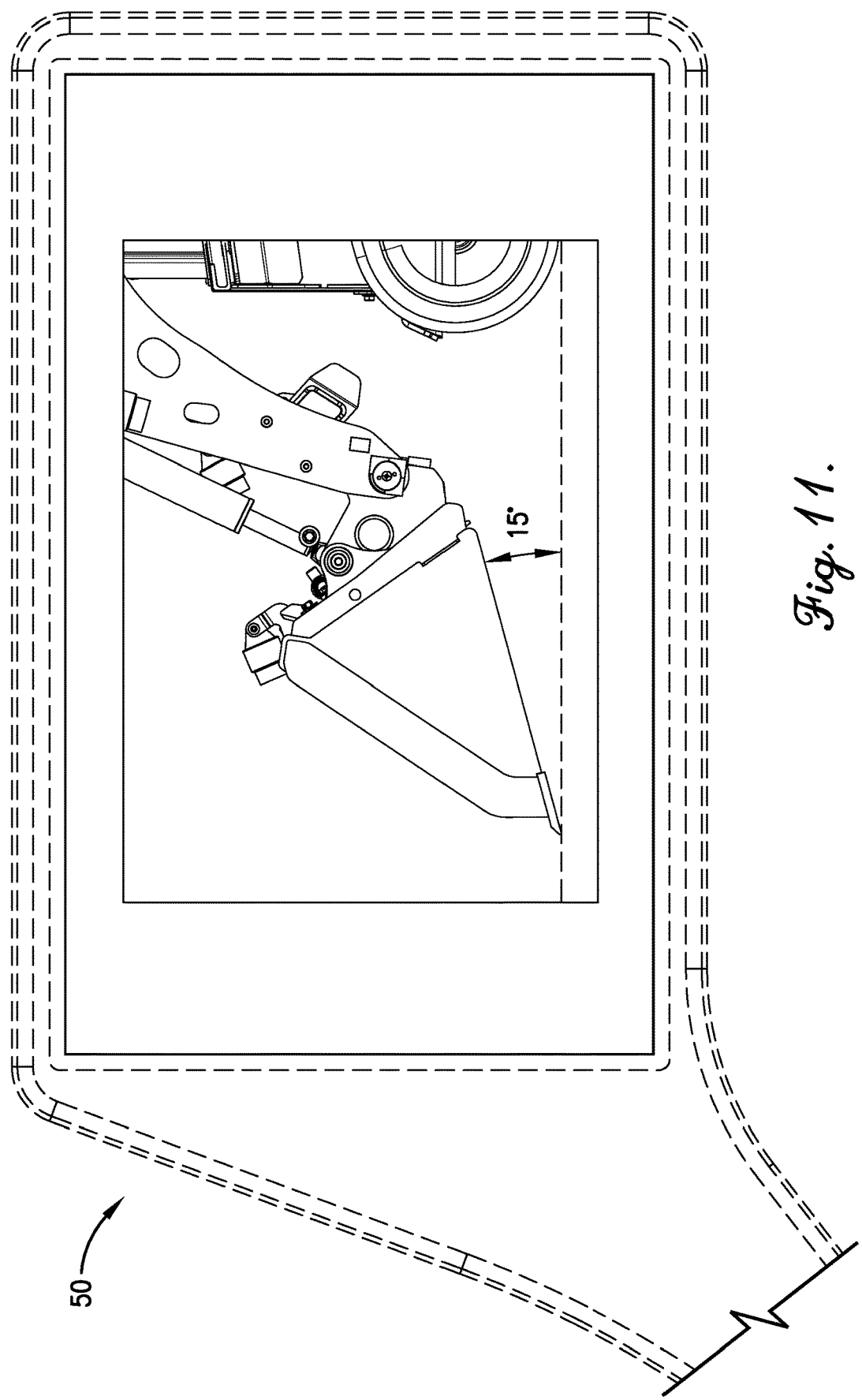
FIG. 11 is a view of a graphic display of the work machine from FIGS. 1-3, with the graphic display presenting a GUI configured to show an operator of the work machine an orientation of the attachment coupled with the work machine.

As was noted previously, the tag 60 associated with the particular attachment 18 may include at least three accelerometers configured to monitor changes to the position/velocity/acceleration of the tag 60 (and thus the particular attachment 18) about the three special dimensions (i.e., −x, −y, and −z axes). The data from the accelerometers may be transmitted from the tag 60 to the work machine's 10 control system in real time, such that the real-time angle and/or position of the particular attachment 18 may be monitored by the work machine 10 and/or presented to the work machine's 10 operator during operation of the attachment 18. For instance, based on the angle and/or position data received from the tag 60, the control system of the work machine 10 may generate a graphical representation of the real-time angle and/or position of the particular attachment 18 and may present such graphical representation on the work machine's 10 graphic display 50, such as illustrated in FIG. 11. The graphical representation may be (i) an image/drawing of the attachment 18 oriented/positioned in the actual angle and/or position of the particular attachment 18 as measured by the accelerometers of the tag 60 associated with the particular attachment 18, and/or (ii) a numerical/textual description of the attachment's 18 actual angle and/or position. As such, the operator can accurately control the angle and/or position of the particular attachment 18 by monitoring the representation displayed on the graphic display 50 and manipulating the user controls 22 (e.g., the joysticks) in response to change the position of the attachment 18 if necessary.

In certain embodiments, the operator of the work machine 10 may enter instructions (e.g., via the graphic display 50) that the attachment 18 should be orientated/located at a particular, preselected angle and/or position during operation, and the control system may be configured to provide real-time feedback to the operator such that the operator (through manipulation of the work machine's 10 user controls 22) can maintain the intended angle and/or position of the attachment 18. For instance, the control system of the work machine 10 may generate deviation information (i.e., information indicating how much the actual angle and/or position of the attachment 18 deviates from the preselected angle and/or position) and may present such deviation information to the operator of the work machine 10. The deviation information may be in the form of a visual alert (e.g., graphical information) presented on the graphic display 50 of the work machine 10, an audible alert generated via one or more speakers, and/or tactile feedback generated through one or more of the user controls 22 of the work machine 10.

In alternative embodiments, the control system of the work machine 10 may automatically control the angle and/or position of the particular attachment 18 based on the real-time angle and/or position data of the attachment 18 as obtained from the attachment's 18 tag 60. For instance, an attachment 18 in the form of an auger may be coupled to a work machine 10. A tag 60 associated with the auger may transmit ID information to the work machine 10, as has been previously described. As such, the control system of the work machine 10 can determine the attachment characteristics associated with the auger. The attachment characteristics may include a preferred operating angle/orientation for the auger (e.g., to remain vertical or plum during operation). Alternatively, the operator of the work machine 10 may provide an instruction to the control system (e.g., via the graphic display 50) that the auger is to be used to form a vertical hole in the ground, and that during such hole formation the auger is to remain vertical (or plum). Regardless, during operation, the real-time angle and/or position data of the auger will be transmitted from the auger's tag 60 to the work machine's 10 control system, and the control system can automatically adjust the actual angle and/or position of the auger as needed to maintain the auger in the vertical (or plum) angle/position. If the control system needs to adjust the angle/position of the auger, the control system can do so automatically by controlling the arm actuators 40 associated with the arms 16 of the work machine 10, the pitch actuators 44 associated with the hitch plate 42 of the work machine 10, the roll actuators 46 associated with the hitch plate 42, the drive motors 36 of the work machine 10, and/or other actuators associated with the auger or the work machine 10. The angle/position adjustments of the auger (or other attachment 18) may be made via electronic over hydraulic (E over H) controls. In some other embodiments, angle/position adjustments of the auger (or other attachment 18) may be made via a standard hydraulic control system.

In view of the above, the control system of the work machine 10 may receive (e.g., from the operator or from the attachment characteristics stored in the memory elements 54 of the control system) an intended position in which the attachment 18 should be maintained. The control system may then compare the actual position of the attachment 18 with the intended position and make any positional adjustments necessary to place the attachment 18 in the intended position. As examples, the intended position may be angular position (e.g., parallel with the ground, perpendicular to the ground, or an angle with respect to the ground between parallel and perpendicular). Alternatively, or in addition, the intended position may be a spatial dimension, such as depth below the ground surface or height above the ground surface.

In certain embodiments, as was noted earlier, the tag 60 may also include a position sensor, e.g., a GPS receiver, for providing an indication of the geographic position of the auger (or other attachment 18). Such position sensor may be used by the operator to guide the work machine 10 and/or the attachment 18 to the proper location on the earth (e.g., on the job site), so that the auger can form holes in the proper geographic locations. Such guidance may also be performed in an automated fashion, e.g., by the work machine's 10 control system controlling the drive motors 36 of the work machine 10 to position the work machine 10 and/or the auger (or other attachment 18) in the appropriate geographic location.

The above-described procedures for angle monitoring and control of an attachment 18 may also be used to monitor and/or maintain the levelness of an attachment 18. For example, certain attachments 18, such as pallet forks, bale spears, buckets, skid cutters, etc., may need to be maintained at specific angles (or level with the ground) during operation. The real-time angle and/or position data received by the work machine's 10 control system (from the tag 60 associated with such an attachment 18) may be used to maintain such specific angle/levelness of the attachment 18.

As was described above, the control system may provide instructions for the operator of the work machine 10 to appropriately manipulate the user controls to maintain the appropriate angle/levelness of the attachment 18. For example, the current angle/levelness of the attachment 18 may be presented on the graphic display 50 of the work machine (see, e.g., FIG. 11 showing the angular position of the attachment), such that the operator may adjust the actual angle/position of the attachment 18 based on the indication presented on the graphic display 50. Alternatively, the control system may automatically maintain the appropriate angle/levelness by controlling the applicable actuators of the work machine 10. Furthermore, in some embodiments, the control system may generate an alert (e.g., audible, visual, or tactile) when the attachment 18 is not in the appropriate angle or levelness. For example, an attachment 18 in the form of a skid cutter may pose an unsafe hazard if the skid cutter is oriented at an angle greater than 45 degrees from ground levelness. As such, the control system of the work machine 10 may generate an alert if the skid cutter angle exceeds the 45 degree threshold. Furthermore, the control system of the work machine 10 may automatically stop hydraulic flow to components of the work machine 10 and/or to the attachment 18 if the attachment 18 is orientated at an angle that is deemed to be a hazard.

In some cases, it may be preferable for the attachment 18 to be angled in general alignment with the ground level (e.g., as with the case the skid cutter discussed above). Embodiments provide for such attachments 18 to be maintained in general alignment with the ground level based on the angle and/or position data received from the tag 60 associated with the implement 18. Specifically, the operator may provide an indication as to when the angle of the attachment 18 is in alignment with the ground level. Such an indication may "zero out" the angle of the attachment 18. Thus, whenever the angle of the attachment 18 (as provided by the tag 60) deviates from the zeroed out position, the angle of the attachment 18 will not be in alignment with the ground level. As such, the operator may manually correct any deviation from levelness with the ground and/or the control system may automatically correct such deviation. In further embodiments, the work machine 10 itself may include one or more accelerometers configured to indicate the angle and/or position of the work machine 10. In such embodiments, the control system may compare the angle/position of the attachment 18 (as indicated by the angle and/or position data received from the tag 60) with the angle/position of the work machine 10 (as indicated by the work machine's accelerometers) to determine if a difference exists. If a difference exists, the operator may adjust the angle/position of the attachment 18 (or the control system may do so automatically), such that the angle/position of the attachment 18 matches the angle/position of the work machine 10. Such embodiments permit the attachment 18 to be maintained in general alignment with the ground surface as the work machine 10 and the attachment 18 travel over varying surfaces.

In addition to monitoring and maintaining the angle of an attachment 18, embodiments may be configured to monitor and maintain a position of such attachment 18. In some embodiments, such control may be based on dimensions of the attachment 18. As was described above, the attachment characteristics associated with a particular attachment 18 may include dimension data for the particular attachment 18, such as length, width, height, etc. Thus, the control system of the work machine 10 may be able to determine such dimensional data based on the ID information received from the tag 60 of the particular attachment 18. Furthermore, during operation of an attachment 18, the attachment's 18 tag 60 may transmit the real-time angle and/or position data of the attachment 18, as was previously described. The control system may use the combination of the dimension data and the real-time angle and/or position data to determine spatial positioning of the attachment 18. For example, if the attachment 18 is a bucket, the control system may be configured to determine a depth of the bucket below the ground level as the bucket is used to dig ground material. Such determined depth of the bucket may be based on the dimension data of the bucket and the real-time angle and/or position data received from the bucket's tag 60. In some embodiments, angle and/or position information for the bucket (including the depth of the bucket) may also be based on position sensors associate with the arms 16 and/or the hitch plate 42 of the work machine 10 (e.g., sensors associated with the actuators 40,44,46 of the arms 16 and/or hitch plate 42 of the work machine 10).

Figure 12:
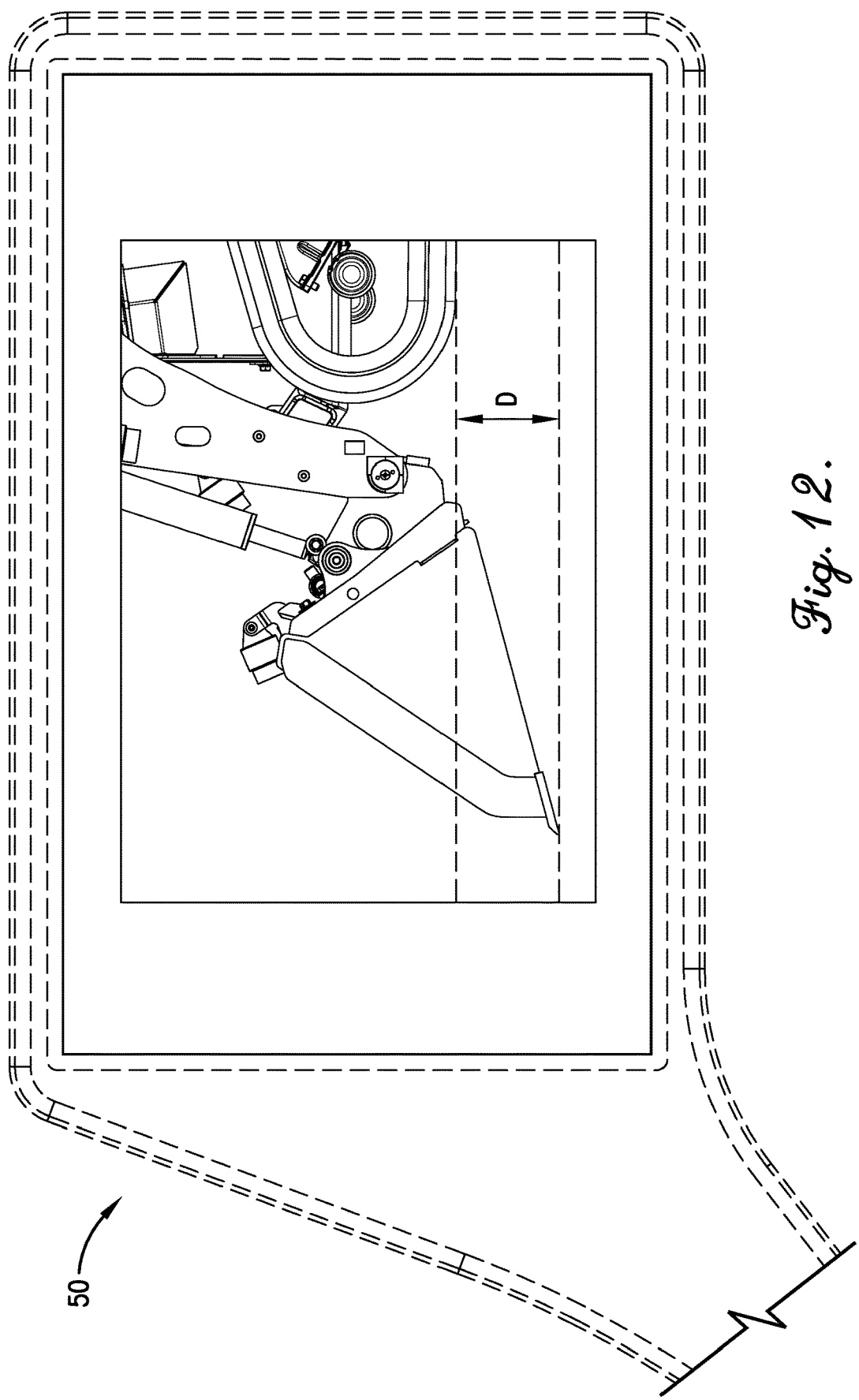
FIG. 12 is a view of a graphic display of the work machine from FIGS. 1-3, with the graphic display presenting a GUI configured to show an operator of the work machine a position and/or depth of the attachment coupled with the work machine.

Regardless, the real-time angle and/or position of the attachment 18 (including the depth of the bucket within the ground) may be presented to the operator via the graphic display 50, as illustrated in FIG. 12, in the form of a graphical representation of the attachment 18 position with respect to the ground. For example, the GUI of FIG. 12 illustrates an implement 18 in the form of a bucket partly positioned below the surface of the ground. Alternatively, or in addition, the angle and/or position (e.g., depth) of the attachment may be shown numerically. For example, FIG. 12 can illustrate the spatial position of the attachment 18, with the depth "D" of the bucket shown below the surface of the ground presented both graphically and as a number of feet or inches below the ground. In further alternatives, the control system may use such the angle and/or position information to maintain a required operating angle and/or position of the attachment 18. As was noted previously, the angle and/or position of the attachment 18 (including the depth of the attachment 18) may be based, in part, on the dimension data associated with the attachment 18. Use of such dimension data may be necessary, as different-sized attachments 18 will occupy different spatial volumes. Thus, a smaller bucket being held a particular angle/position by the arms 16 of the work machine 10 may not extend below the ground surface at the same depth as a larger bucket being held at the same particular angle/position by the work machine's 10 arms 16.

Camera Control

In certain embodiments of the present invention, the work machine 10 may include a plurality of image sensors positioned at various locations on or in the work machine. The image sensors are configured generally to capture real-time images and/or video of the work machine 10, the attachment 18, and/or the working/surrounding environment of the work machine 10. The image sensors may commonly include visual spectrum cameras; however, in various embodiments the image sensors may comprise other types of sensors, such as IR sensors, radar sensors, LiDAR sensors, or the like. Nevertheless, the general term "cameras" will be used herein. Embodiments of the present invention include a vision control system, such that the real-time images and/or video obtained by the cameras may be presented on the graphic display 50 of the work machine 10, and the operator can view the images and/or video in real-time during operation of the work machine 10 and/or the attachment 18.

In some embodiments, as illustrated by FIGS. 1-3, the work machine 10 may include a plurality of such cameras (illustrated as reference number 80), and may include one or more cameras 80 on the front, on the back, and on both lateral sides of the work machine 10. Furthermore, some cameras 80 may be positioned high on upper portions of the work machine 10, while other cameras may be positioned low on lower portions of the work machine 10. Other cameras 80 may be positioned on mid-level portions of the work machine 10. In certain further embodiments, one or more cameras 80 may be positioned on the arms 16 of the work machine 10, on the hitch plate 42 of the work machine 10, and/or on the attachment 18 coupled with the work machine 10. Some other cameras 80 may be positioned on internal spaces of the work machine 10, such as within the control station (e.g., the cab 20).

Figure 13:
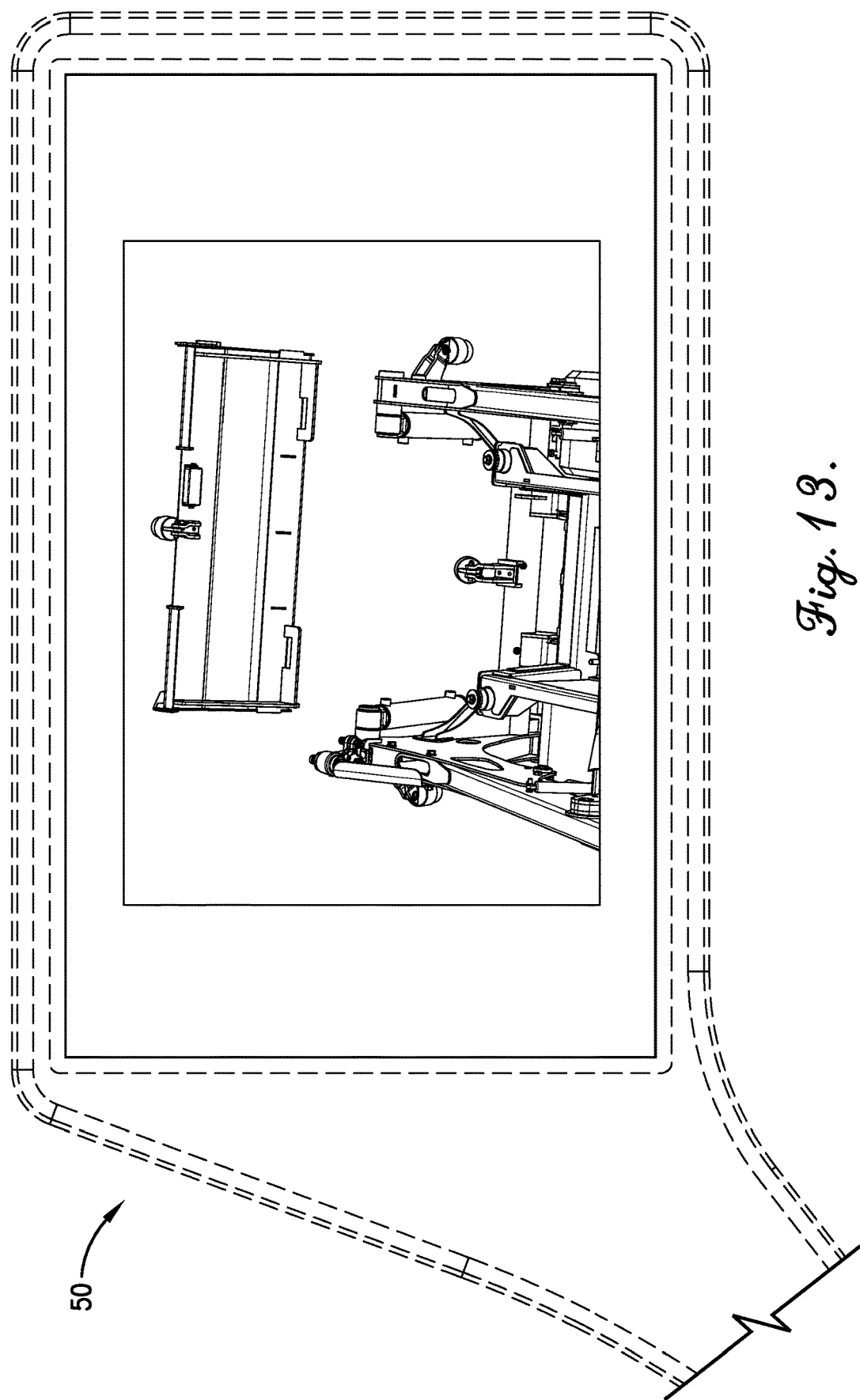
FIG. 13 is a view of a graphic display of the work machine from FIGS. 1-3, with the graphic display presenting an image and/or video obtained from a camera positioned on a lower, front portion of the work machine.

In view of the above, the cameras are configured to provide various real-time views to the operator of the work machine 10. For example, cameras 80 located on the front of the work machine 10 may be directed forward to provide a forward view, which can be used by the operator to view the work machine 10, attachment 18, and/or external environment when operating or propelling the work machine 10 forward. For example, FIG. 13 illustrates images and/or video obtained from cameras 80 positioned on the front of the work machine 10 to provide a forward view, which can be displayed on the graphic display 50 to aid the operator in controlling the work machine 10 when coupling with an attachment 18 in the form of a bucket.

Figure 14:
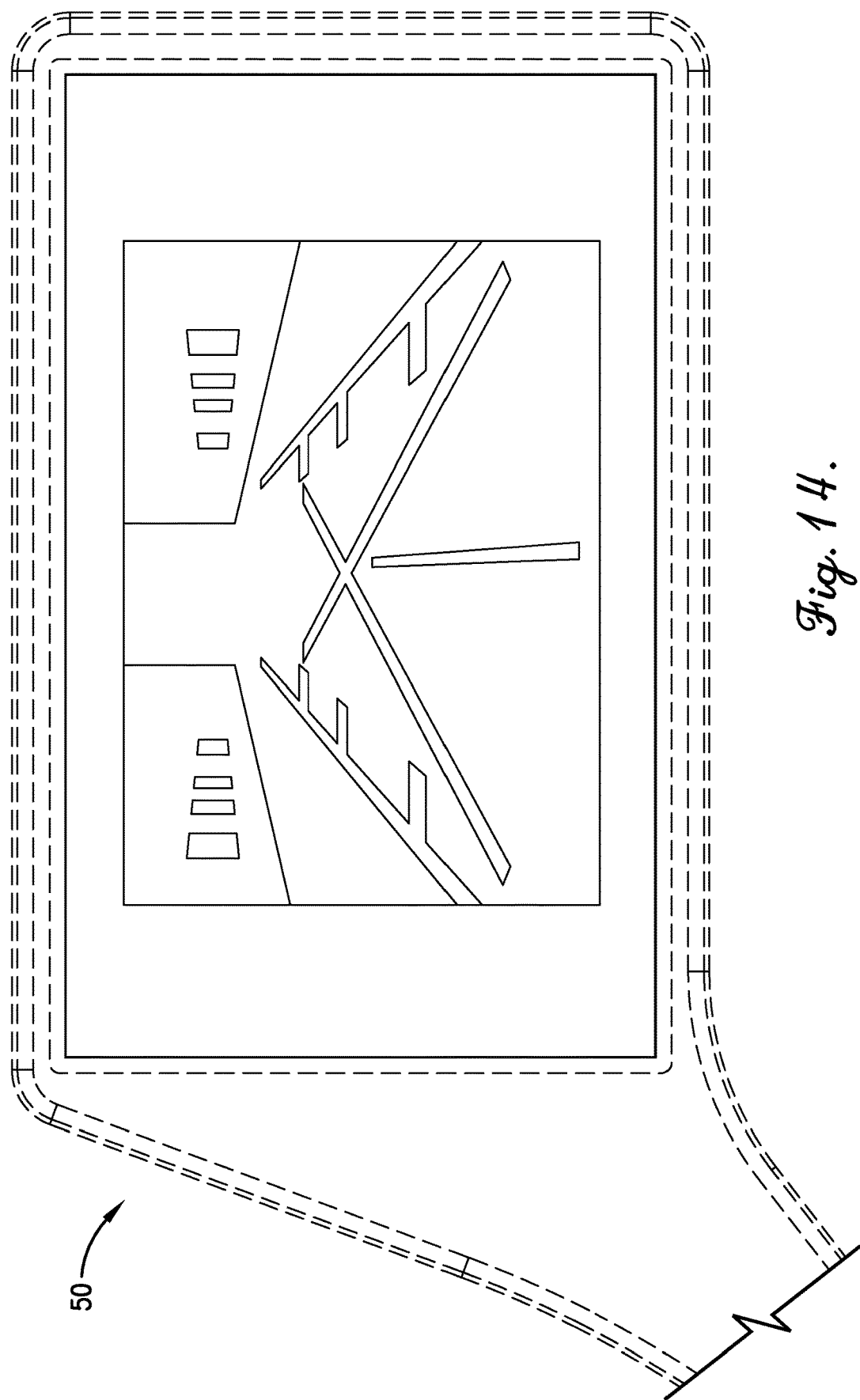
FIG. 14 is a view of a graphic display of the work machine from FIGS. 1-3, with the graphic display presenting an image and/or video obtained from a camera positioned on a rearward end of the work machine.

Similarly, cameras 80 located on the back of the work machine 10 can be directed rearward to provide a rearward view. For example, FIG. 14 illustrates images and/or video obtained from cameras 80 positioned on the back of the work machine 10 to provide a rearward view, which can be displayed on the graphic display 50 to aid the operator in controlling the work machine 10 when traveling in reverse. Specifically, such views can be used by the operator to view the rear of the work machine 10 and/or external environment when operating or propelling the work machine 10 in reverse.

Figure 15:
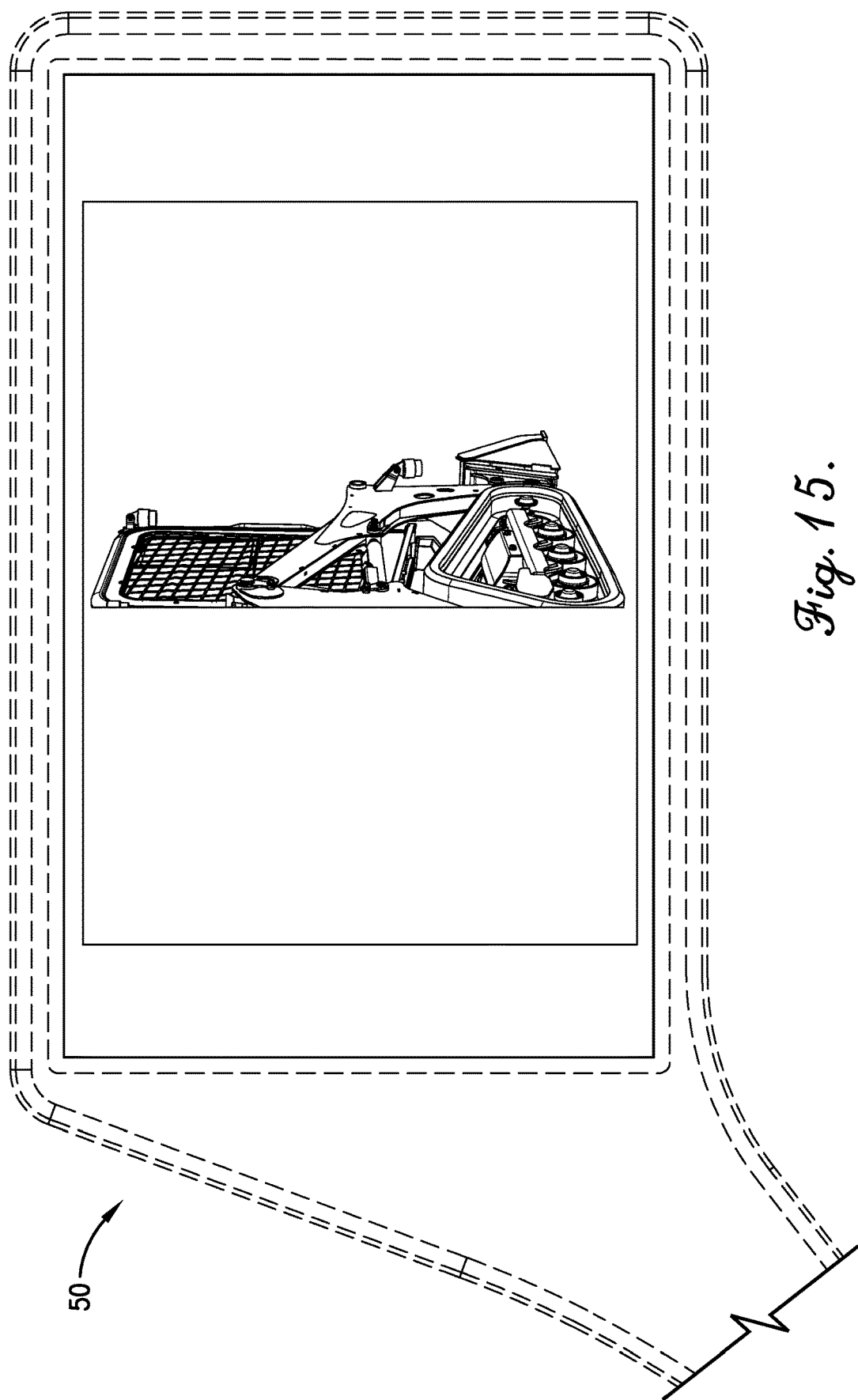
FIG. 15 is a view of a graphic display of the work machine from FIGS. 1-3, with the graphic display presenting an image and/or video obtained from a camera positioned on a lateral side of the work machine.

Cameras 80 located on the lateral sides of the work machine 10 can be directed laterally outward to provide a sideview. For example, FIG. 15 illustrates images and/or video obtained from cameras 80 positioned on the lateral sides of the work machine 10, which can be displayed on the graphic display 50 to aid the operator in controlling the work machine 10. However, in some embodiments, the positions of the various cameras 80 may be manually adjusted so as to be aimed in any necessary direction. In further alternatives, the cameras 80 may be associated with motors, which can be activated to adjust the positions of the cameras 80 as necessary to be aimed in any necessary direction. In such embodiments, the positions of the cameras 80 may be controlled by the control system of the work machine 10.

The images and/or video presented on the graphic display 50 from the particular cameras 80 (e.g., on the front, the back, or the sides of the work machine 10) may be automatically selected by the control system of the work machine 10 depending on the direction of travel of the work machine 10. For example, when traveling in a forward direction, the control system may automatically provide for the graphic display 50 to display images and/or video obtained from cameras 80 positioned on the front of the work machine 10 (see, e.g., FIG. 13). In contrast, when traveling in a rearward direction, the control system may automatically provide for the graphic display 50 to display images and/or video obtained from cameras 80 positioned on the back of the work machine 10 (see, e.g., FIG. 14). Alternatively, the operator may select (e.g., via interaction with the graphic display 50), which particular camera 80 and/or directional views to present on the graphic display 50.

In some embodiments, graphic elements may be overlaid onto the images and/or video presented to the operator on the graphic display 50 to assist the operator during operation of the work machine 10 and/or associated attachment 18. For example, as shown in FIG. 14, when propelling the work machine 10 in reverse, graphic elements in the form of boundary lines or direction lines may be overlaid onto the images and/or video generated by the cameras 80 positioned on the back of the work machine 10. Such boundary lines may provide an indication as to the width of the work machine 10 and/or the attachment 18 to ensure that the work machine 10 and/or the attachment 18 can safely travel along the current rearward path without interfering with objects within the external environment. Similarly, graphic elements in the form of direction lines may be overlaid onto the images and/or video generated by the cameras 80 positioned on the back of the work machine 10 to provide an indication as to the current and/or intended direction of movement of the work machine 10. Such direction lines may change as the operator shifts the user controls 22 when changing the travel direction of the work machine 10. The graphic elements may also include an element representative of the work machine. Furthermore, as will be described in more detail below, the graphic elements may comprise work project elements, which are elements that provide an operator with guidance for accurately operating the work machine 10 and/or the attachment 18 within the work area (e.g., within the project site).

Figure 16:
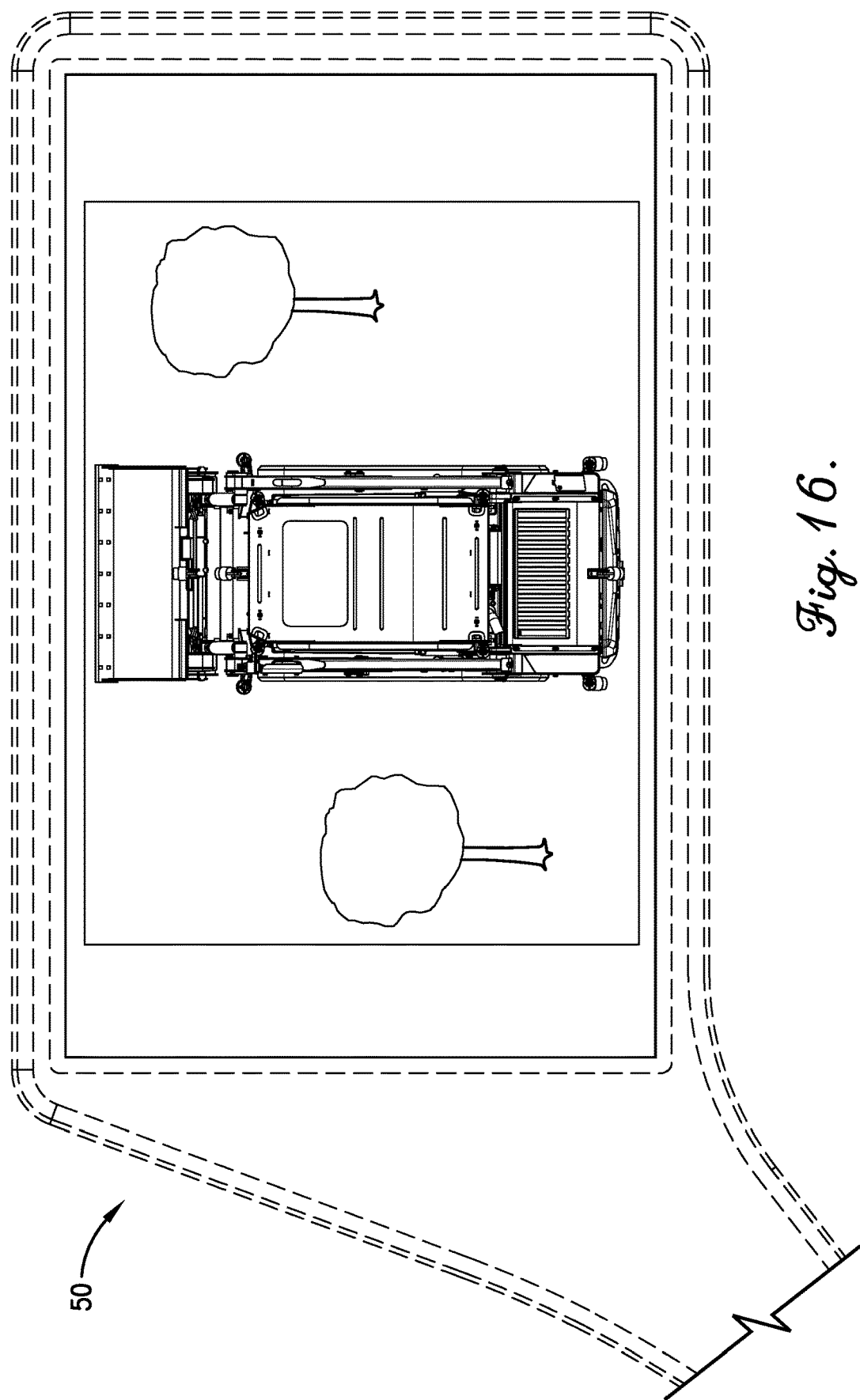
FIG. 16 is a view of a graphic display of the work machine from FIGS. 1-3, with the graphic display presenting a "bird's eye" image and/or video of the work machine obtained from two or more cameras positioned on the work machine.

In addition to singular views (e.g., forward or rearward views), embodiments may provide for the images and/or video from a plurality of the cameras 80 to be combined to provide enhanced views of the work machine 10, the attachment 18 and/or the external environment. For example, the images and/or video from two or more (or each of a plurality) of the cameras 80 positioned around the work machine 10 may be combined to provide a "birds eye" view of the work machine 10, the attachment 18, and/or the external environment in which the work machine 10 is operating, with such a bird's eye view being from above the work machine 10. In some embodiments, the work machine 10 will be positioned in the center of the bird's eye view. However, the work machine 10 may not be positioned in the center of the bird's eye view in various other embodiments. An exemplary bird's eye view of the work machine 10 is shown in FIG. 16, with the view being presented on the work machine's 10 graphic display 50. As shown, the bird's eye view includes an image and/or video of the work machine 10 operating between a pair of trees. Thus, such a bird's eye view can be used by the operator to safely and accurately operate the work machine 10 without inadvertently colliding with external objects within the environment.

In some embodiments, the cameras 80 will capture images and/or video of the work machine 10 which will be positioned within the center of the bird's eye view. Alternatively, a graphic element in the form of a representation of the work machine 10 may be overlaid onto the center of the bird's eye view to represent the work machine 10 within the external environment. Such a bird's eye view permits the operator to efficiently observe the location of the work machine 10, with such view having, in some embodiments, a 360 degree observable area of the external environment around the work machine 10. Other combined views may also be generated, such as combined views that show the work machine 10, the attachment 18, and/or eternal environment from the perspective of a forward direction, a rearward direction, and/or lateral side directions.

In some embodiments, the bird's eye view may provide a generally narrow field of view (e.g., within about 10 feet from the work machine 10). Such a narrow field of view is helpful to provide the operator with information regarding obstacles within the working area of the work machine 10. However, in other embodiments, it may be beneficial to provide a bird's eye view with a wide field of view (e.g., greater than 10 feet from the work machine).

For example, for certain attachments 18, such as trenchers, it may be beneficial to provide a bird's eye view with a wide field of view that covers the entire (or a significant portion of) the work area or job site. An exemplary bird's eye view of an attachment 18 in the form of a trencher working within a work site is shown in FIG. 17, which illustrates the bird's eye view being presented on the graphic display 50 of the work machine 10. The images and/or video included in the bird's eye view may include images and/or video of the trench that has already been formed by the trencher (with such images and/or video obtained by cameras 80). Such a wide field of view may be helpful for the operator to determine whether the trench being formed by the trencher is following an intended direction (e.g., the trench is being formed in an accurate and/or straight direction) through the entire work area. In certain additional embodiments, the control system may be configured to overlay, onto the wide-angle bird's eye view, one or more graphic elements in the form of an intended trench path along which the trencher is intended to form a trench (or other work path that the relevant attachment is intended to follow and/or perform work) within the work area. The graphical elements overlaid onto the bird's eye view may be stored in (or otherwise obtained by) the work machine's control system to be presented on the graphic display 50 as part of the bird's eye view.

The operator can use such a wide-angle bird's eye view and the overlaid graphic elements (e.g., an intended trench path) as a guide to ensure that the trencher is forming and/or has formed the trench in the required locations within the work area. For example, the bird's eye view illustrated in FIG. 17 includes a work machine 10 with an attachment 18 in the form of a trencher shown forming a trench within a work area. The portion of the trench shown extending to the right side of the work machine 10 may be an image and/or video of the trench having already been formed by the trencher (with such images and/or video obtained by the cameras 80). Thus, the operator can confirm that the work machine 10 formed the trench in the proper location. The portion of the trench shown extending directly in front of the work machine may be a graphic element of a trench overlaid onto the bird's eye view, with the intent of the graphic element being to provide an indication to the operator as to the appropriate direction of travel of the work machine 10 as the work machine 10 continues to form the trench within the work area.

Furthermore, in some embodiments, the attachment 18 and/or the work machine 10 may include GPS sensors configured to obtain or generate geographic location information for the attachment 18 and/or work machine 10. Such location information may be transmitted to the control system of the work machine 10. Thus, for example, when the attachment 18 (e.g., a trencher) is being used to form a trench, location information can be used by the control system of the work machine 10 to ensure that the trench is being formed in the appropriate location (e.g., in a straight line). Similarly, location information can be recorded (as measured via the GPS) to create a record of where the trench is located, such as may be used by government/municipal agencies or homeowners (e.g., to know where power, water, sewer, or other lines are located). Similar guidance and recording processes can be used with other attachments 18 (e.g., with augers used to form fence posts during the manufacture of a fence line).

Notably, embodiments provide for preferred camera views to be automatically presented on the graphic display 50 of the work machine based on the type of attachment 18 coupled with and being used by the work machine 10. For example, when an attachment 18 in the form of a bucket is coupled with the work machine 10, the control system may determine that a narrow-field bird's eye view is the preferred view and will automatically present such preferred view on the graphic display 50. Such a preferred view may be included as part of the attachment characteristics for the bucket. Thus, the preferred view may be automatically determined from the attachment characteristics of the bucket upon the ID information of the bucket's tag 60 being transmitted to the work machine 10. Alternatively, when an attachment 18 in the form of a trencher is coupled with the work machine 10, the control system may determine (based on the attachment characteristics of the trencher) that the wide-field bird's eye view is the preferred view and will present such preferred view on the graphic display 50.

The control system may also automatically determine which cameras 80 from which to present images on the graphic display 50, based on the attachment 18 that is coupled with the work machine 10. For example, if an attachment 18 in the form of a bucket or a sweeper is coupled with the work machine 10, the control system may determine (based on the attachment characteristics of the attachment 18 as determined based on the ID information transmitted from the attachment's 18 tag 60) that a lower, front, right-side view is preferred, so as to allow the operator of the work machine 10 to be able to align the right side of the bucket or the sweeper as necessary in the work area (see, e.g., FIG. 13). As shown in FIG. 13, given that the lower, front, right-side view is preferred, the control system may automatically present images and/or video on the graphic display 50 from one or more cameras 80 positioned on the lower, front, right-side of the work machine 10. Similarly, if an attachment 18 in the form of a plow blade is coupled with the work machine 10, the control system may determine (based on the attachment characteristics of the plow blade) that a lower, front, left-side view is preferred, so as to allow the operator of the work machine to align the left side of the plow blade with the edge of the surface being plowed. In contrast, if an attachment 18 in the form of a pallet fork is coupled with the work machine 10, as shown in FIG. 18, the control system may determine (based on the attachment characteristics of the pallet fork) that an upper, front-side view is preferred, so as to allow the operator of the work machine to view the pallet fork carrying its load (see, e.g., FIG. 18). Thus, as shown in FIG. 18, given that the upper, front-side view is preferred, the control system may automatically present images and/or video on the graphic display 50 from one or more cameras 80 positioned on the upper, front-side of the work machine 10.

Furthermore, however, the control system may be configured to automatically change the camera view (e.g., away from the primary preferred camera view) if the preferred view becomes obstructed or otherwise problematic. For example, in the case of the pallet fork, if the pallet fork is raised to a sufficient height, such that the pallet fork and/or its load obscures the view of the camera 80 generating the upper, front-side view, the control system may change the camera 80 and/or the view being presented on the graphic display 50 to a lower, front-side view (as obtained by a camera 80 located on the lower front-side of the work machine 10) so that the operator can still view portions of the pallet fork and/or external working environment. Such changes from view to view may be made based on the current position and/or dimensions (or other attachment characteristics) of the attachment 18. The position of the attachment 18 may be updated in real time based on the angle/position data received from the tag 60 associated with the attachment 18 and/or from sensors associated with the arms 16 and/or hitch plate 42 of the work machine 10. In addition, the dimensions of the attachment 18 may be determined from the attachment characteristics of the attachment 18 (e.g., dimensions of the attachment 18), which as described previously, are based on the ID information transmitted by the tag 60 of the attachment 18. Thus, although the relatively-large pallet fork may obscure the view of the upper, front-side camera 80 when it is raised to a particular height, a relatively small attachment (e.g., small bucket) may not obscure the view of the upper, front-side camera 80 when it is raised to the same particular height. The control system is configured to determine when a particular camera 80 is (or may be) obscured based on the position, dimensions, and/or type of attachment 18 currently coupled with the work machine 10. As such, the control system can change the camera views presented on the graphic display 50 when certain cameras 80 are obscured.

In view of the above, the control system of the work machine 10 may be configured to determine, based on the ID information transmitted by the tag 60 of a particular attachment 18: one, two, or more preferred images sensors (e.g., cameras 80) to be used when operating the work machine 10 with the particular attachment 18. For example, the control system may determine that a first preferred camera 80 and a second preferred camera 80 are generally preferred to be used with the particular attachment 18. In some embodiments, the control system may combine the images and/or video from the first and second preferred cameras 80 to be presented on the graphic display 50 of the work machine 10 (e.g., as in the case with the bird's eye view). Alternatively, or in addition, the control system may initially present the images and/or video from one of the preferred cameras 80 (e.g., the first preferred camera 80) on the graphic display 50, but may change to display the images and/or video from the other of the preferred cameras 80 (e.g., the second preferred camera 80) when the images and/or video from the first preferred camera 80 is unsatisfactory (e.g., when the view of the first preferred camera 80 is physically blocked by the attachment 18 and/or components of the work machine 10). For example, the control system may be configured to determine when view of given camera 80 is at least partially blocked based on (i) position information of the attachment 18, as transmitted by the tag 60 of the attachment 18, (ii) position information of the attachment 18 and/or components of the work machine 10, e.g., as generated by position sensors associated with roll actuators 46, tilt actuators 44, and/or arm actuators 40 of the work machine 10, and/or (iii) a viewing angle of the given camera. Upon determining that a view provided by a first preferred camera 80 is blocked (or otherwise unsatisfactory) the control system may change the view presented on the graphic display 50 to a second preferred camera 80.

Telematics & Mobile App

In addition to communicating with work machines 10, the tags 60 associated with attachments 18 (and/or the work machine 10) may also communicate with the cloud (e.g., remote servers) and/or mobile apps via wired or wireless networks. All of the data described herein that is transmitted between the attachments 18 and the work machines 10 may also be transmitted to the cloud for access by remote computing devices. The remote computing devices may be remote desktops that can access the cloud via the web or other distributed network, or may be mobile devices that can access the cloud via a mobile app. Exemplary data that may be transmitted from the tags 60 to the cloud may be position data (e.g., as generated by GPS receivers within the tags 60) of the attachments 18 and/or usage information (e.g., as generated by clocks or timers within the tags 60). As such, users of remote devices may access the cloud to determine the real-time location and/or historical location information of any of the attachments 18 owned and/or used by the user. Such users may also remotely obtain usage information from the cloud, such as for purposes of managing service and maintenance requirements for the user's attachments 18.

In more detail, the tags 60 of the attachments 18 may store and transmit usage information of the attachments 18 (e.g., number of hours used for operation) to the work machine 10, such that the operator of the work machine 10 may determine the amount of time the attachment 18 has been operating (e.g., total amount of operating time or amount of time operating since last maintenance/service). Such usage information may be presented on the graphic display 50 to indicate to the operator as to when the next maintenance or servicing should be performed on the attachment 18. Such usage information may also be transmitted to the cloud, such that remote users can determine when the next maintenance or servicing should be performed for each of the user's attachments 18. In some embodiments, service reminders may be generated in the cloud and periodically sent to the remote users (e.g., via the mobile app.).

In addition to the above, various other usage information may be tracked by the tags 60 of the attachment 18 and/or the work machine 10 and transmitted to the cloud. For example, the number of times an attachment 18 has been coupled/decoupled from a work machine 10, the type of work machine 10 to which the attachment 18 has been coupled, and generally any other trackable information may be captured by the tags 60 and/or the work machine 10 and transmitted to the cloud for future review and analysis by remote devices.

Although the invention has been described with reference to the one or more embodiments illustrated in the figures, it is understood that equivalents may be employed and substitutions made herein without departing from the scope of the invention as recited in the claims.

What is claimed is:

1. A system for controlling a travel speed of a work machine, said system comprising:
   said work machine; and
   said attachment, wherein said attachment is configured to be removably coupled to said work machine,
   wherein said work machine is configured to provide hydraulic fluid to said attachment, and wherein said work machine is configured to measure the hydraulic pressure of the hydraulic fluid provided to said attachment, wherein said attachment includes an identification module with a transmitter configured to transmit identification information to said work machine when said attachment is coupled to said work machine, wherein said work machine is configured to determine a preferred operating pressure at which hydraulic fluid is to be provided to said attachment, wherein said preferred operating pressure is determined based on the identification information transmitted from said identification module to said work machine, wherein said work machine is configured to compare the measured hydraulic pressure with the preferred operating pressure and to automatically decrease the travel speed of said work machine if the measured hydraulic pressure is higher than the preferred operating pressure and to automatically increase the travel speed of said work machine if the measured hydraulic pressure is lower than the preferred operating pressure.

2. The system of claim 1, wherein said work machine includes a hydraulic system configured to provide the hydraulic fluid to said attachment, wherein said hydraulic system includes a pressure sensor configured to measure the hydraulic pressure of the hydraulic fluid provided to said attachment.

3. The system of claim 2, wherein said work machine comprises a control system including one or more processing elements and one or more memory elements, wherein said control system receives the measured hydraulic pressure from the pressure sensor and compares the measured hydraulic pressure with the preferred operating pressure.

4. The system of claim 3, wherein said work machine includes one or more drive motors, and wherein said hydraulic system provides hydraulic power to said drive motors.

5. The system of claim 4, wherein said hydraulic system includes a hydrostatic transmission for providing hydraulic power to said drive motors.

6. The system of claim 5, wherein the control system is configured to decrease the travel speed of said work machine by adjusting the hydraulic power to said drive motors when the measured hydraulic pressure is higher than the preferred operating pressure.

7. The system of claim 5, wherein the control system is configured to increase the travel speed of said work machine by adjusting the hydraulic power to said drive motors when the measured hydraulic pressure is lower than the preferred operating pressure.

8. The system of claim 1, wherein said work machine comprises a track loader.

9. The system of claim 1, wherein said attachment is a hydraulically-operated attachment selected from the following: an auger, a grinder, a jack hammer/breaker, a tiller, a roller, a trencher, a digger derrick, a cold mill, a brush/sweeper, a grapple, a tree/post puller, and a power rake.

10. The system of claim 1, wherein said identification module comprises a housing secured to said attachment.

11. The system of claim 1, wherein said identification module comprises one or more processing elements, one or more memory elements, and/or one or more accelerometers, and wherein the transmitter is a wireless transmitter.

12. The system of claim 11, wherein said memory element stores the identification information, wherein said identification information is indicative of said attachment, and wherein said identification module is configured to transmit the identification information to said work machine upon the accelerometers detecting motion indicative of said attachment being coupled with said work machine.

13. The system of claim 12, wherein said work machine comprises a control system including one or more processing elements and one or more memory elements, wherein said control system is configured to store attachment characteristics for a plurality of different attachments, wherein said control system is configured to determine attachment characteristics of said attachment based on the identification information received from the identification module.

14. The system of claim 13, wherein the attachment characteristics of said attachment include the preferred operating pressure.

15. A method of controlling a travel speed of a work machine, said method comprising the steps of:
coupling an attachment to the work machine, wherein the attachment includes an identification module with a transmitter;
transmitting identification information from the identification module of the attachment to the work machine;
determining a preferred operating pressure at which hydraulic fluid is to be provided from the work machine to the attachment, wherein the preferred operating pressure is determined based on the identification information transmitted from the identification module to the work machine;
providing hydraulic fluid, under pressure, from the work machine to the attachment;
measuring the hydraulic pressure of the hydraulic fluid provided to the attachment;
comparing the measured hydraulic pressure with the preferred operating pressure; and
automatically increasing the travel speed of the work machine if the measured hydraulic pressure is less than the preferred operating pressure, and automatically decreasing the travel speed of the work machine if the measured hydraulic pressure is greater than the preferred operating pressure.

16. The method of claim 15, wherein said work machine includes a hydraulic system configured to provide the hydraulic fluid to said attachment, wherein said hydraulic system includes a pressure sensor configured to measure the hydraulic pressure of the hydraulic fluid provided to said attachment.

17. The method of claim 16, wherein said work machine comprises a control system including one or more processing elements and one or more memory elements, wherein said control system receives the measured hydraulic pressure from the pressure sensor and compares the measured hydraulic pressure with the preferred operating pressure.

18. The method of claim 17, wherein the work machine includes one or more drive motors, and wherein the hydraulic system provides hydraulic power to the drive motors.

19. The method of claim 18, wherein the control system is configured to decrease the travel speed of the work machine by adjusting the hydraulic power to the drive motors when the measured hydraulic pressure is higher than the preferred operating pressure.

20. The method of claim 15, wherein the identification module comprises one or more accelerometers, and wherein the identification module transmits the identification information to the work machine upon the accelerometers detecting motion indicative of the attachment being coupled with the work machine.

* * * * *